April 1, 1952
R. C. BOHANNAN ET AL
2,591,502
ROAD PAVING MACHINE
Filed April 2, 1949
14 Sheets-Sheet 1
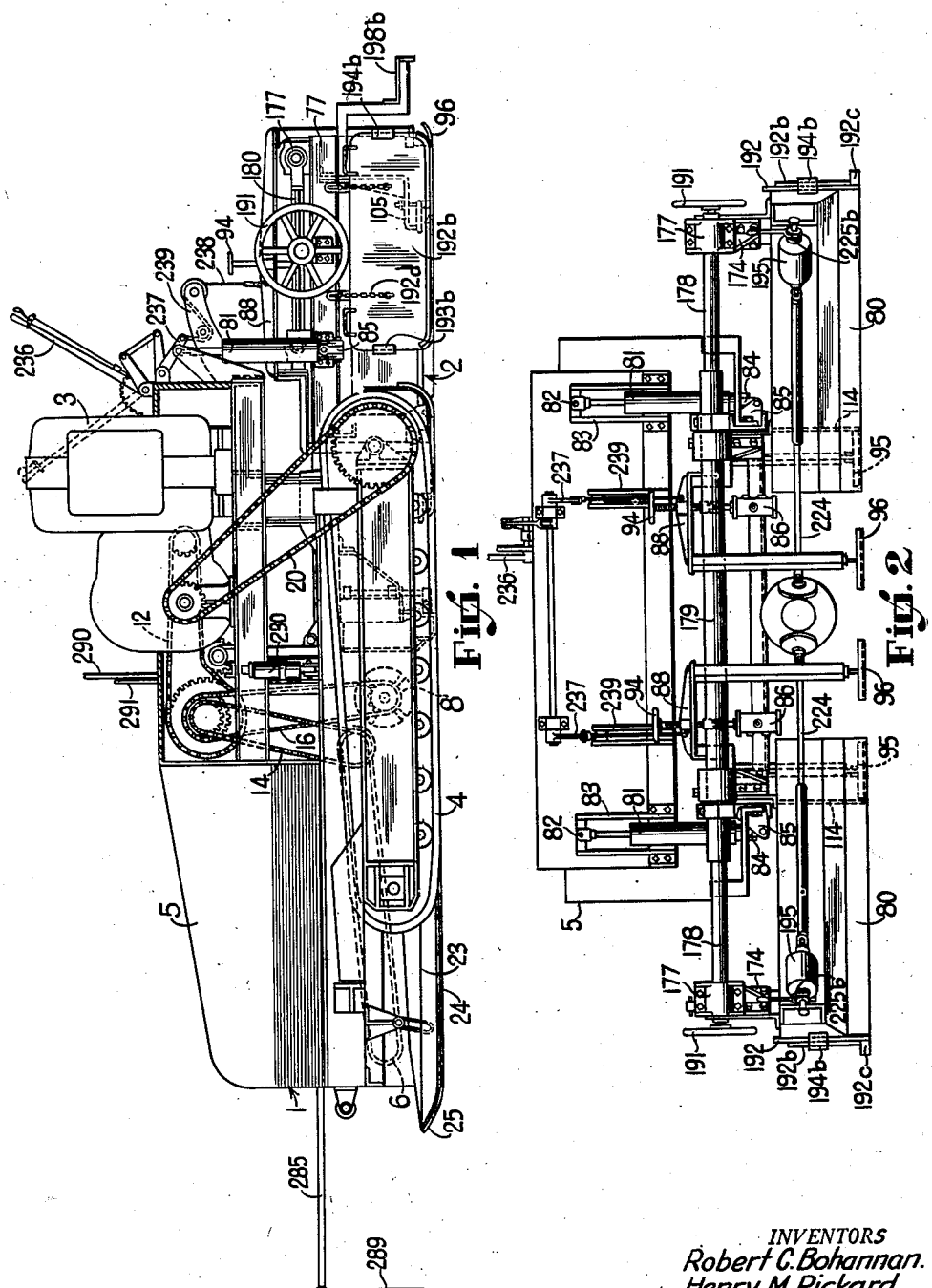
INVENTORS
Robert C. Bohannan.
Henry M. Pickard.
Harold R. Horning.
BY
Corbett, Mahoney & Miller
ATTORNEYS

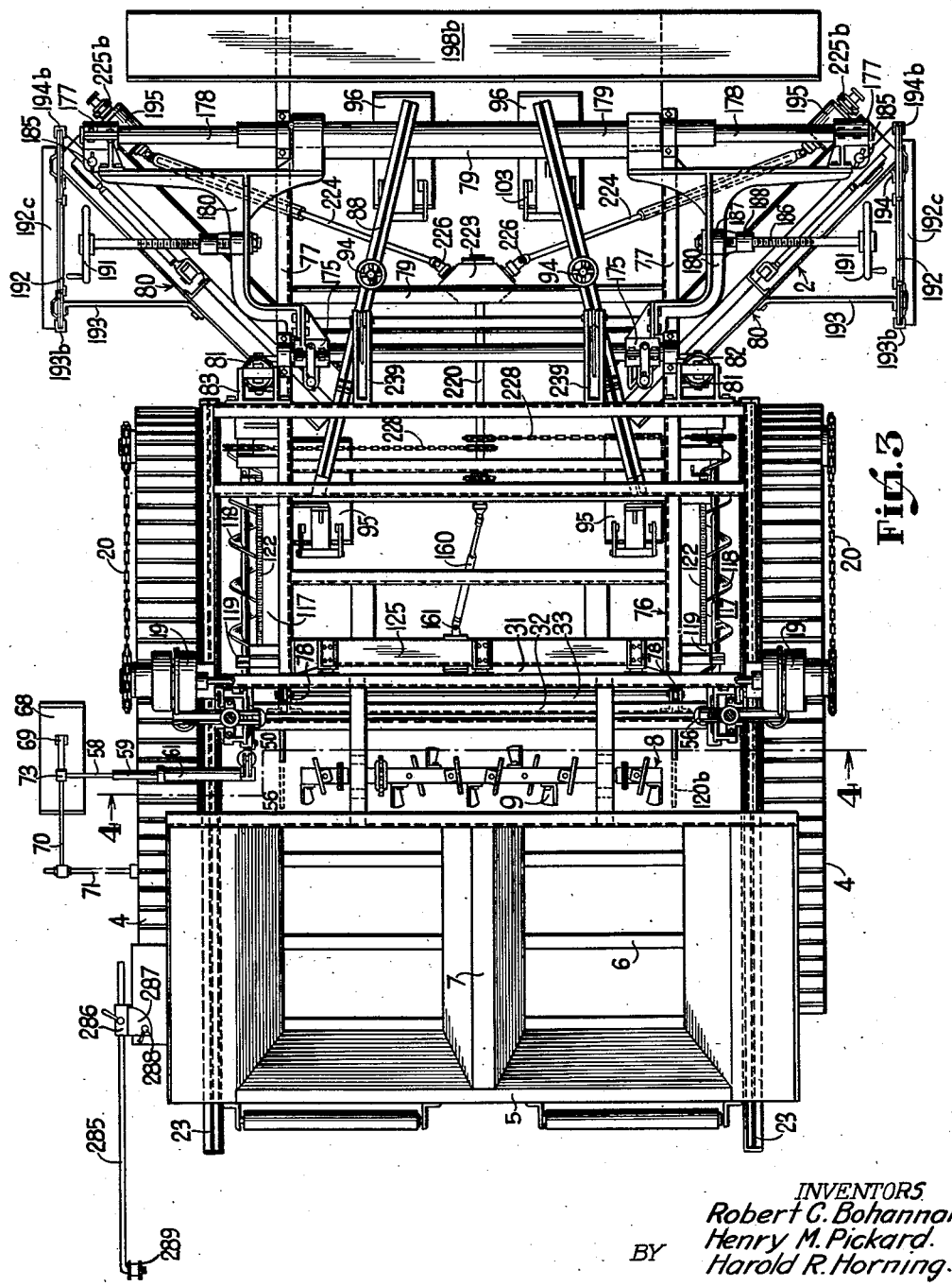

INVENTORS
Robert C. Bohannan.
Henry M. Pickard.
Harold R. Horning.
BY
ATTORNEYS

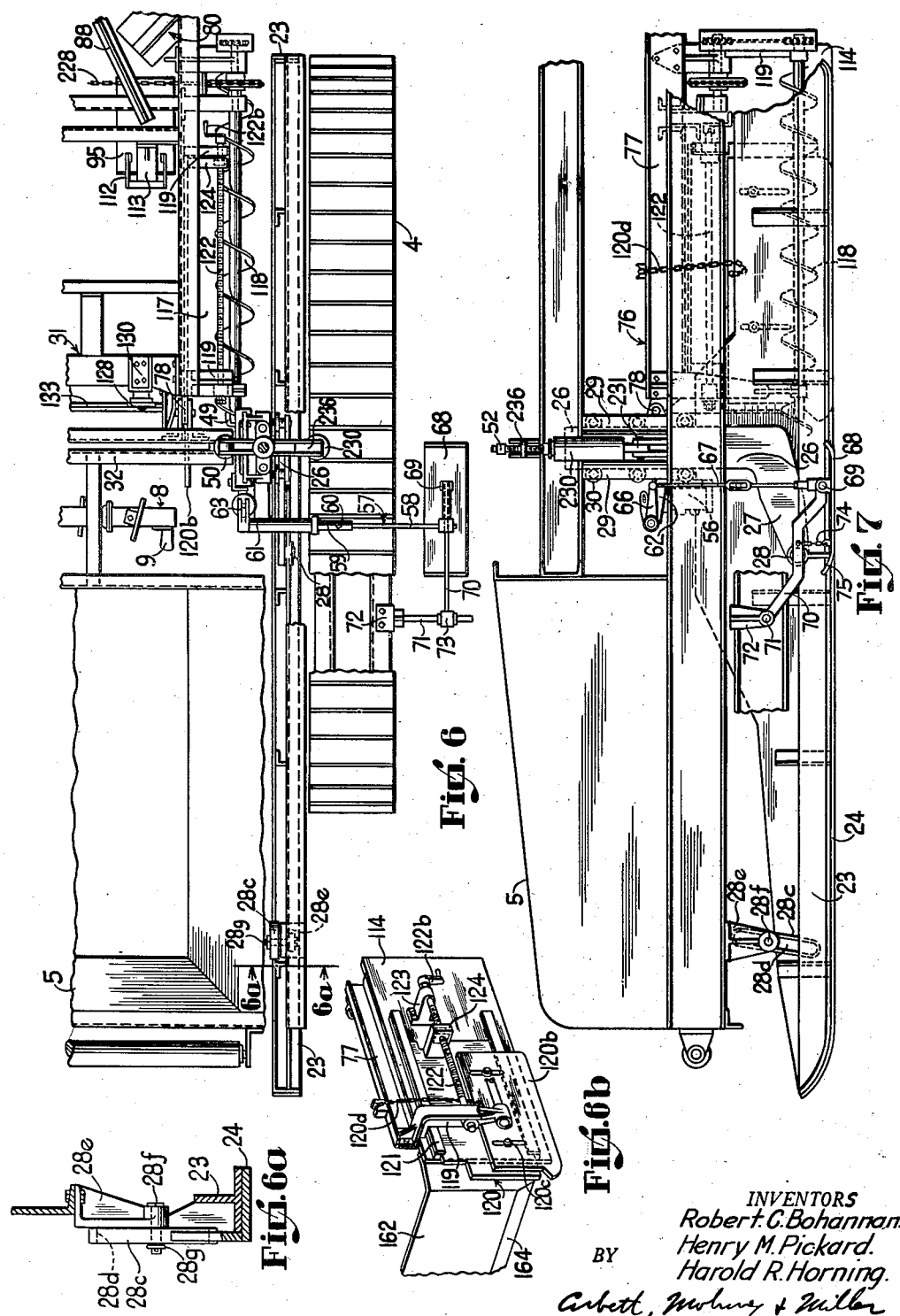
INVENTORS
Robert C. Bohannan.
Henry M. Pickard.
Harold R. Horning.
ATTORNEYS April 1, 1952     R. C. BOHANNAN ET AL     2,591,502
ROAD PAVING MACHINE
Filed April 2, 1949     14 Sheets-Sheet 5
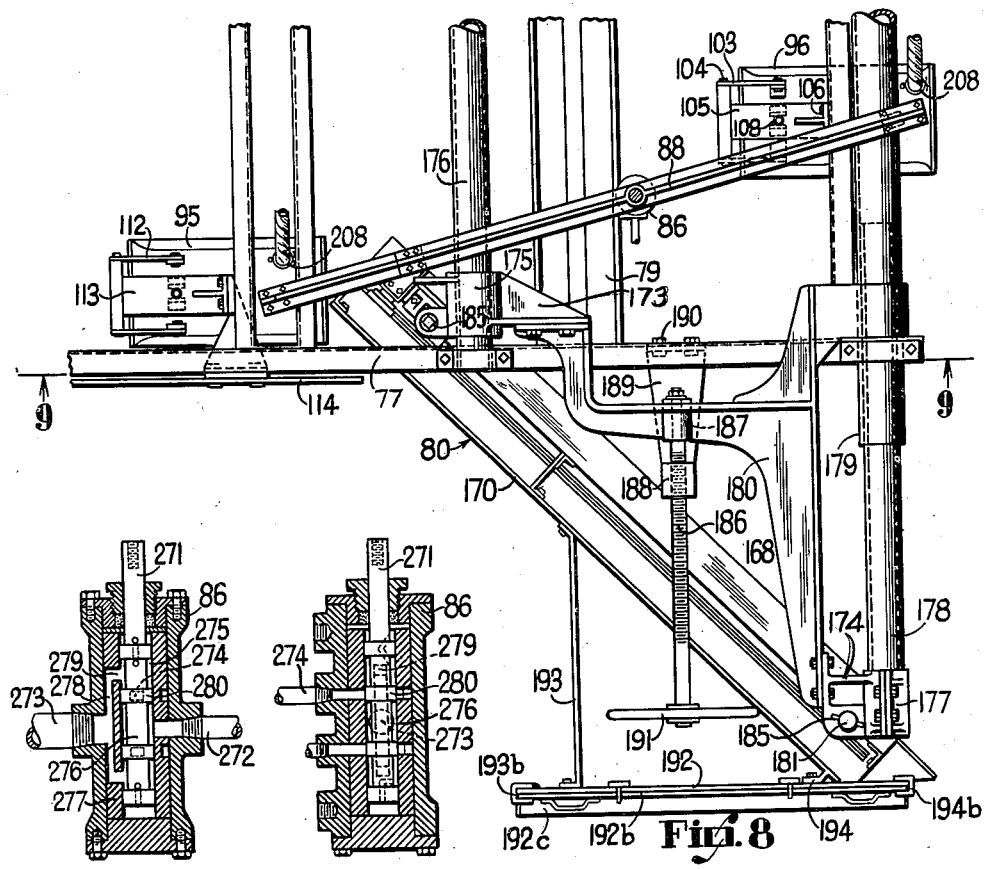
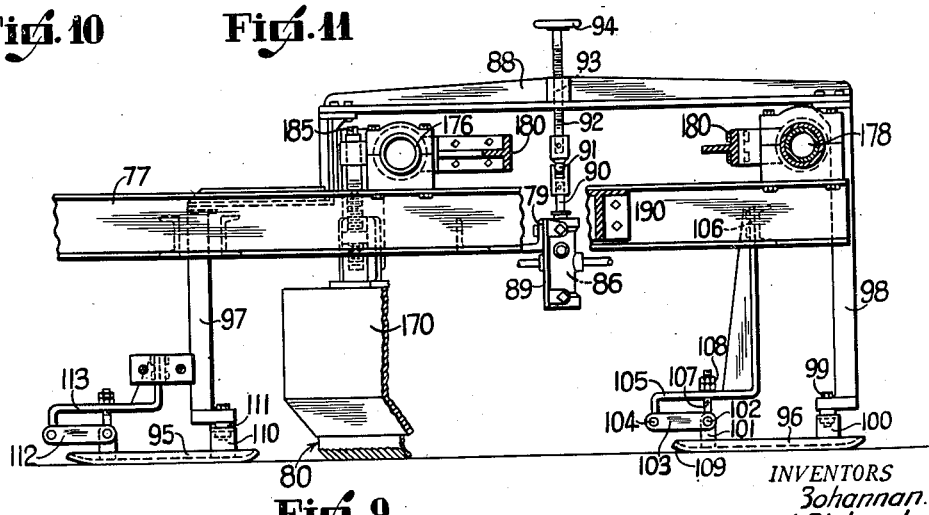
INVENTORS
R. C. Bohannan.
Henry M. Pickard.
Harold R. Horning.
BY
ATTORNEYS

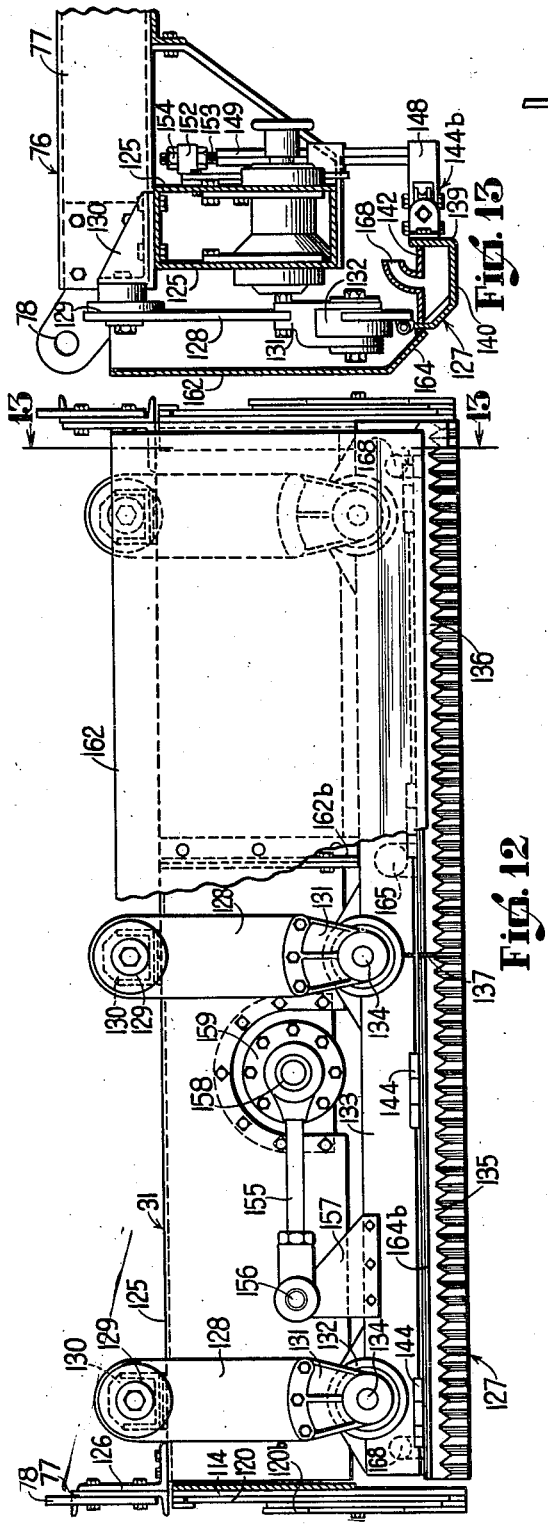

April 1, 1952  R. C. BOHANNAN ET AL  2,591,502
ROAD PAVING MACHINE
Filed April 2, 1949  14 Sheets-Sheet 7
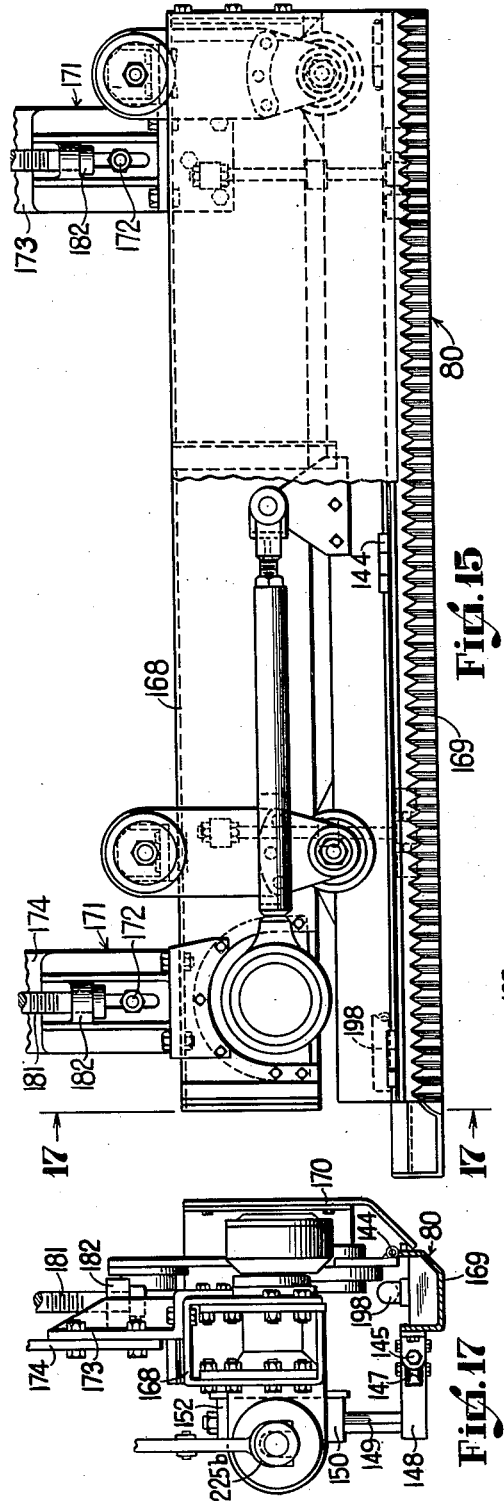
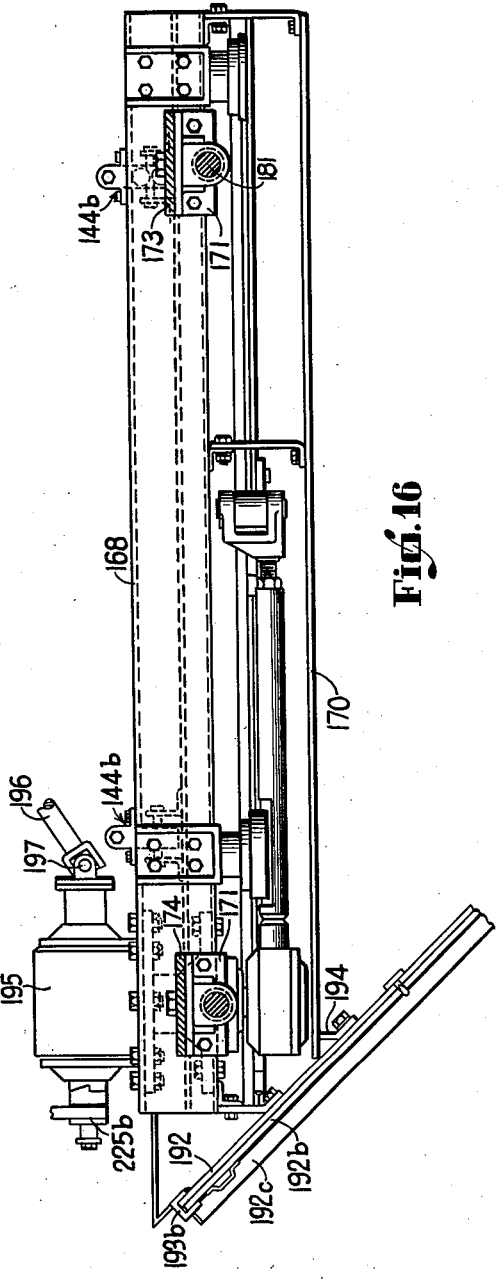
INVENTORS
Robert C. Bohannan,
Henry M. Pickard,
Harold R. Horning.
BY
ATTORNEYS April 1, 1952 R. C. BOHANNAN ET AL 2,591,502
ROAD PAVING MACHINE
Filed April 2, 1949 14 Sheets-Sheet 8

INVENTORS
Robert C. Bohannan.
Henry M. Pickard.
Harold R. Horning.
BY
ATTORNEYS

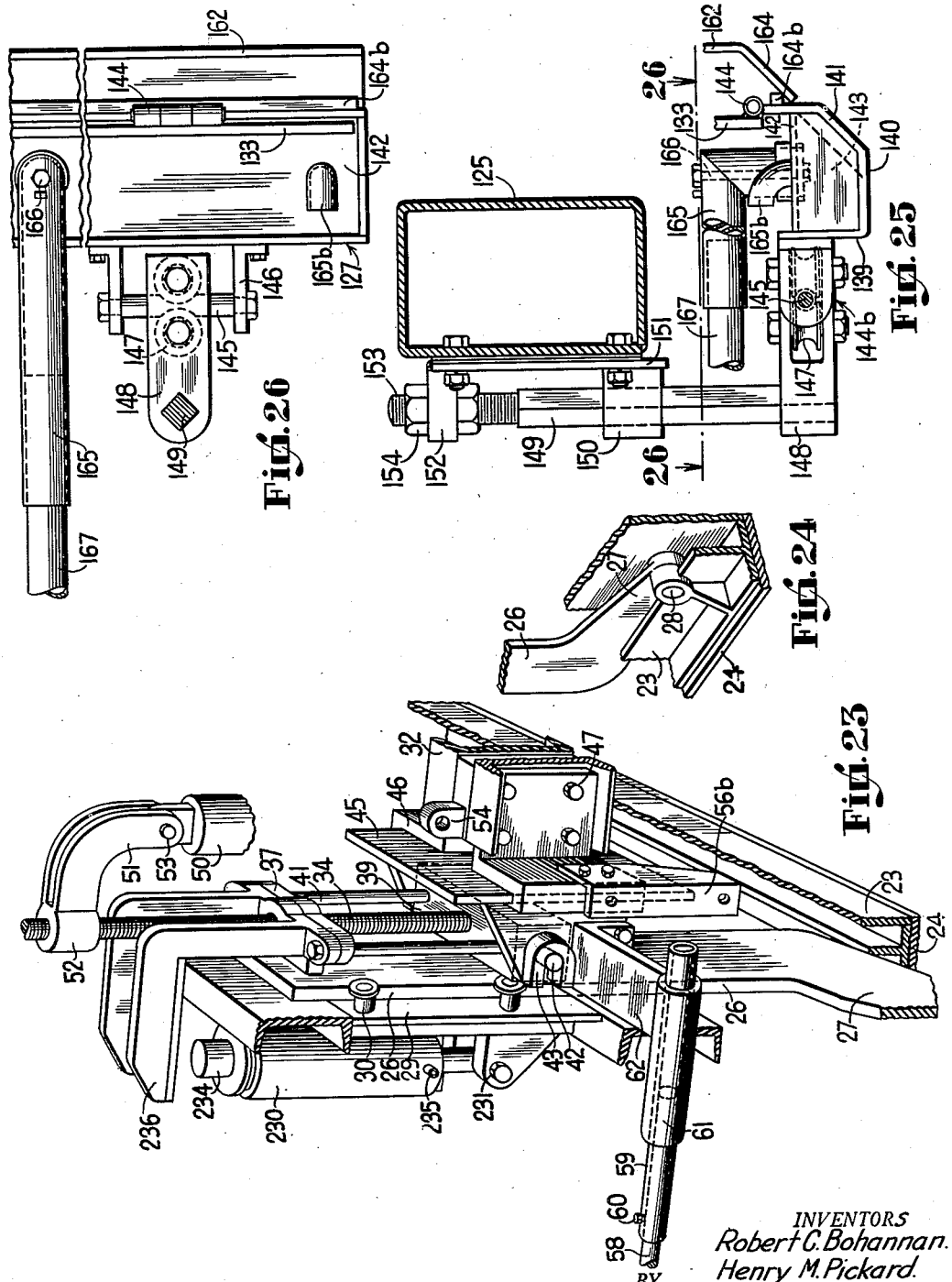

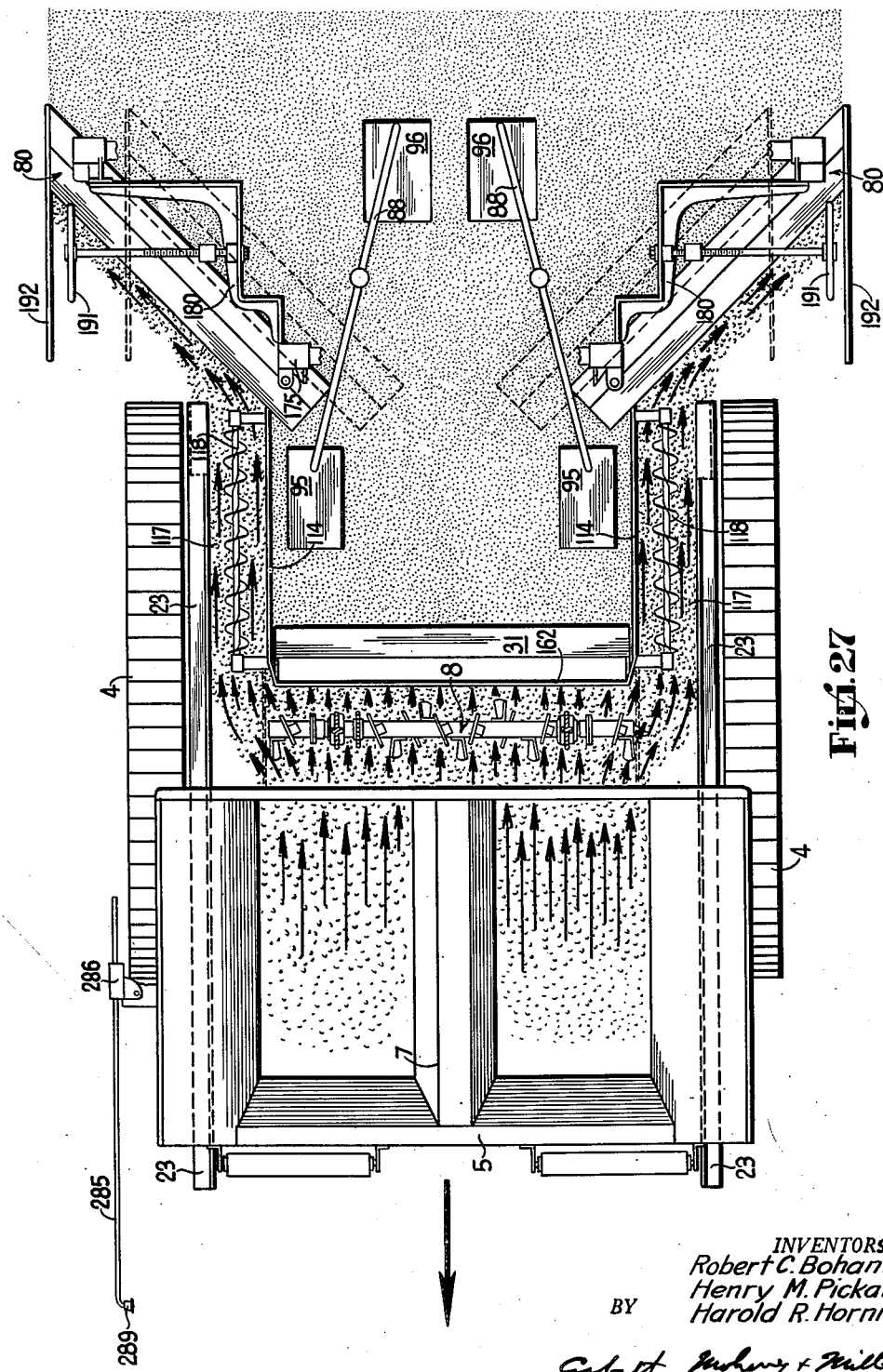

April 1, 1952  R. C. BOHANNAN ET AL  2,591,502
ROAD PAVING MACHINE
Filed April 2, 1949  14 Sheets-Sheet 12
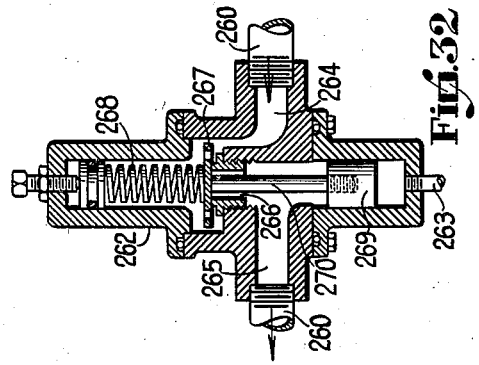
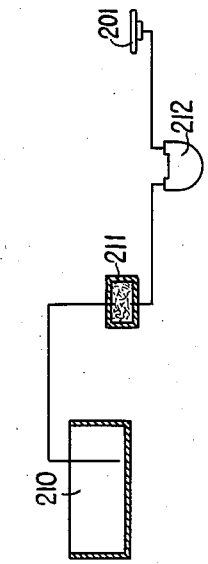
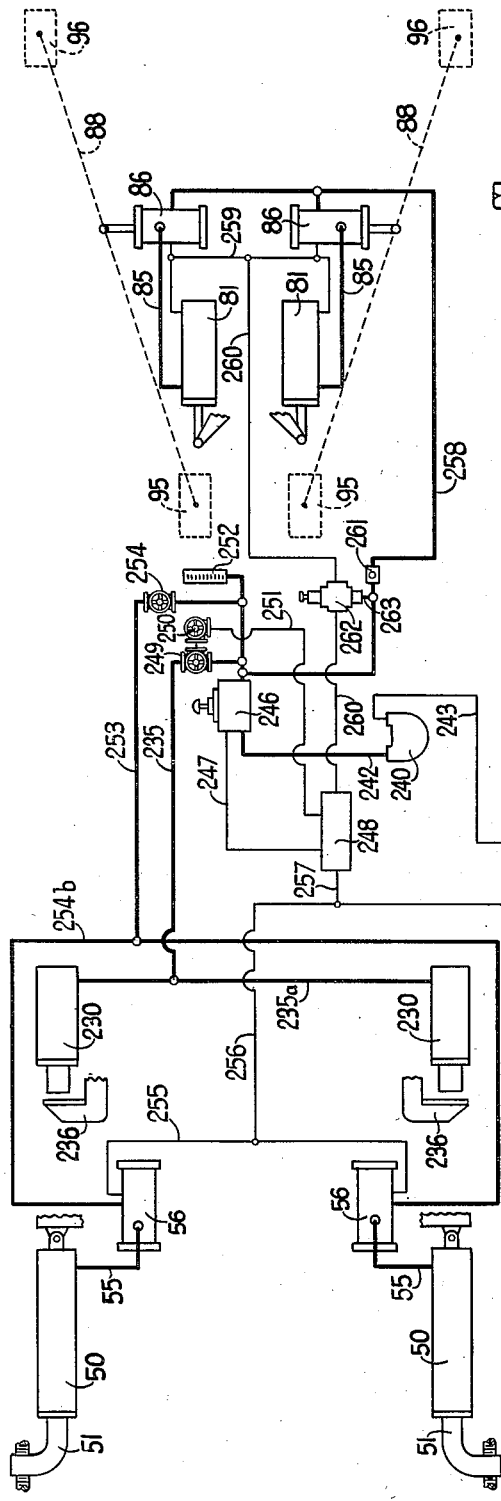
INVENTORS
Robert C. Bohannan.
Henry M. Pickard.
BY Harold R. Horning.
ATTORNEYS April 1, 1952 R. C. BOHANNAN ET AL 2,591,502
ROAD PAVING MACHINE
Filed April 2, 1949 14 Sheets-Sheet 13
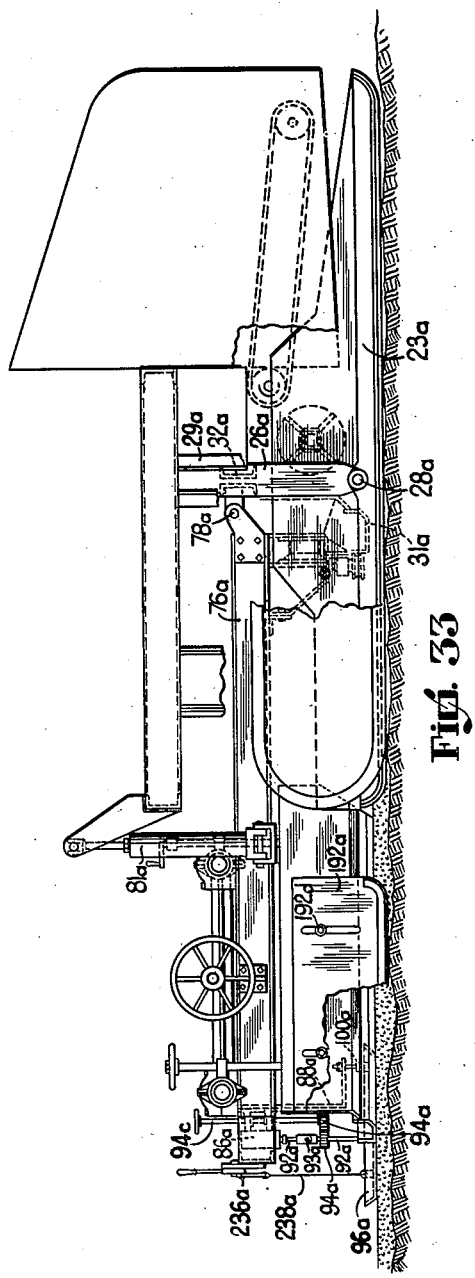
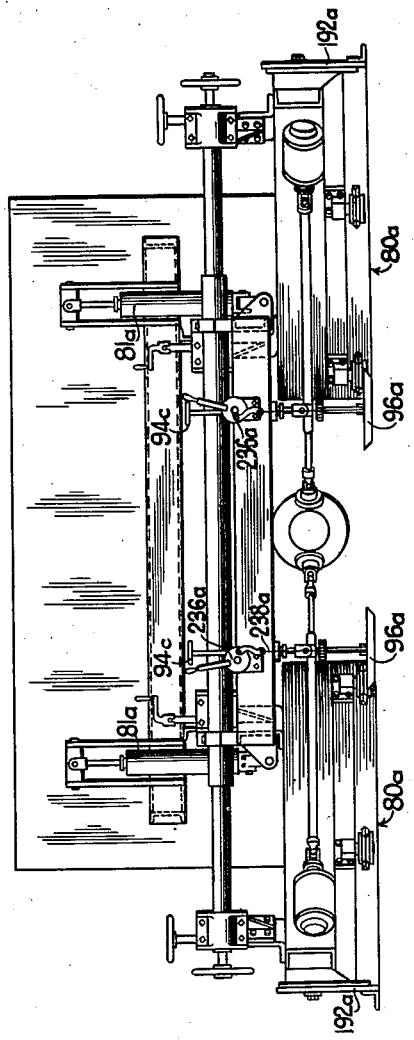
INVENTORS
Robert C. Bohannan.
Henry M. Pickard.
Harold R. Horning.
BY
Corbett, Mackay & Miller
ATTORNEYS April 1, 1952 R. C. BOHANNAN ET AL 2,591,502
ROAD PAVING MACHINE
Filed April 2, 1949 14 Sheets-Sheet 14
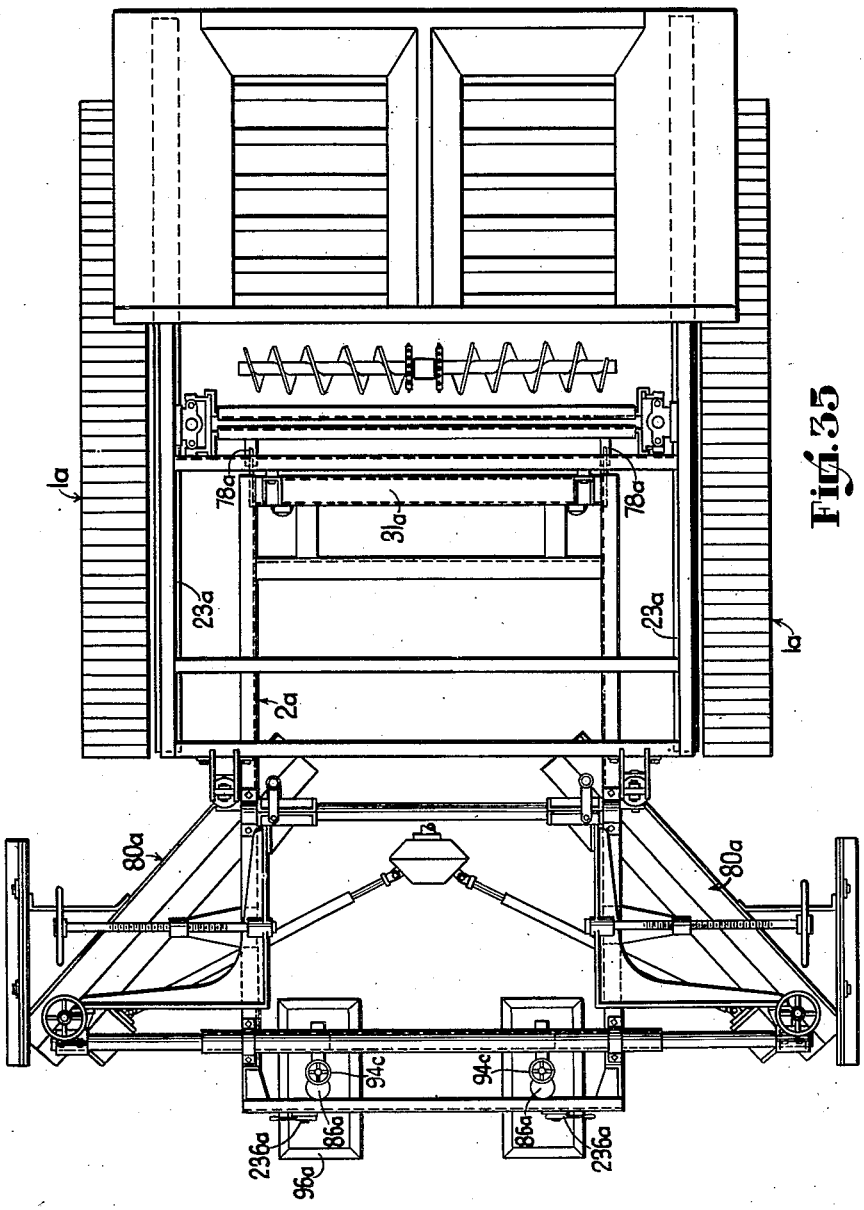
INVENTORS.
Robert C. Bohannan.
Henry M. Pickard.
Harold R. Horning.
BY
ATTORNEYS Patented Apr. 1, 1952

2,591,502

UNITED STATES PATENT OFFICE 2,591,502

ROAD PAVING MACHINE

Robert C. Bohannan and Henry M. Pickard, Columbus, and Harold R. Horning, Parma, Ohio, assignors to The Jaeger Machine Company, Columbus, Ohio, a corporation of Ohio Application April 2, 1949, Serial No. 85,244

44 Claims. (Cl. 94—46)

1

Our invention relates to a road-paving machine. It has to do, more particularly, with a machine for applying a layer or mat of material with straight edges to a relatively rough surface, such as a concrete base, an old road surface or a rough graded surface, and producing thereon a smooth surface of proper pre-determined contour in both a longitudinal and a transverse direction which is either of the same general contour as the rough surface being covered or is of different contour from such rough surface. Our machine is particularly useful with bituminous mixes but is also capable of use with concrete or other aggregate road-building materials.

More specifically, our invention relates to that type of road paver which comprises generally a material-receiving and spreading unit for receiving material and depositing it on the surface to be covered and a material leveling and material finishing unit disposed in association with the first unit and adapted to act upon the material deposited thereby.

A machine of the general type indicated above is illustrated in the patent to Mosel No. 2,054,436, dated September 15, 1936. The leveling unit of this machine included elongated longitudinally extending and laterally spaced runners adapted to bridge the irregularities of the surface being covered. These runners carried a transversely disposed screed member which formed the finished surface and since the screed was supported by the long runners, the irregularities of the surface being covered would be averaged out in the finished surface produced by the screed. Although this machine functioned very successfully in laying strips or lanes of a width corresponding to the spacing of the runners, it could not lay strips wider than the spacing of the runners inasmuch as no means was provided for spreading the material beyond the runners. In order to overcome this difficulty, the machine illustrated in Mosel Patent No. 2,054,437, dated September 15, 1936, was designed. This machine was similar to the machine disclosed in Patent No. 2,054,436 but the finishing and leveling unit included auxiliary screeds or blender screeds which were supported on the rear ends of the runners in angular relationship so as to direct some material rearwardly and laterally beyond the rear ends of the runners. Thus, with this machine it was possible to produce strips of material of greater width than the spacing of the runners. However, since these auxiliary or blender screeds were carried by the rear ends of the runners and the main screed

2 was carried substantially midway of the ends of the runners, any vertical movement of the runners caused by them passing over the irregularities of the surface being covered, would move the auxiliary screeds vertically to a different extent than the main screed. The result was that the surface produced by the main screed, that is the center portion of the strip, and the surfaces produced by the auxiliary screeds, that is the side portions of the strip, would not be identical in longitudinal contour. Furthermore, it was necessary to adjust the auxiliary screeds vertically and laterally manually. Therefore, in laying one strip adjacent another strip, it was very difficult to operate the auxiliary screeds adjustments in such a manner as to match one strip with the other. In an attempt to overcome the disadvantages of this machine, the machine illustrated in Millikin and Pickard Patent No. 2,295,519, dated September 8, 1942, was designed. This machine carried the main screed member at the rear ends of the runners so that it could extend beyond the runners and spread the material beyond such runners. In addition, this machine included automatic control means for changing the elevation of the screed and averaging out the irregularities of the surface being covered in the surface being produced. This structure overcame the difficulty of forming the layer beyond the runners and also the difficulty of the difference in vertical movement of a main screed and auxiliary screeds since a single screed spanned the entire width of the strip produced. However, with this machine it was still difficult to blend one strip with an adjacent strip and to adjust the machine in order to vary the width of strips produced by the machine, the latter procedure necessitating the use of block-off members or extension members to change the effective length of the screed.

The main object of our invention is to provide a road-paving machine of the type indicated composed of a material-receiving and spreading unit and an associated leveling and finishing unit which are so constructed and arranged relative to each other that they will cooperate in producing a layer of material having straight edges and finished smooth surface of proper contour in both a transverse and a longitudinal direction, which is of the same general contour as the rough surface being covered or is of different general contour from such rough surface, the finished surface being free of the irregularities of the relatively rough surface which irregularities are averaged out in the final surface by the machine during the application of the material to the rough surface and the formation of the final surface on such material.

Another object of our invention is to provide a road-paving machine of the type indicated wherein the material-receiving and spreading unit is of the self-propelled tractor type which is so designed that it will receive the road-building material, distribute it and spread it across the surface to be covered so that a leveling and finishing unit associated therewith can act effectively on such spread material.

Another object of our invention is to provide a machine of the type indicated wherein the leveling and finishing unit is disposed substantially in trailing relationship to the tractor unit and is pulled along by such tractor unit which is designed to travel on the relatively rough surface to be covered, the two units being connected together to permit each to move vertically without affecting the other so that vertical movement of the tractor unit operating on the rough surface will have no effect on the leveling and finishing unit and so as to permit the leveling action of the latter unit in such a manner as to average out irregularities of the rough surface being covered in the finished surface produced by the machine.

Another object of our invention is to provide a machine of the type indicated wherein the leveling and finishing unit includes screed members that are so carried by the machine that they will not support any substantial weight of the machine on the surface of the layer of material being formed beneath such members so as to prevent undue compaction of the layer of material in order not to retard the curing or setting of the material.

Another object of our invention is to provide a machine of the type indicated wherein the leveling and finishing unit includes elongated longitudinally extending and laterally spaced runners which have associated therewith a plurality of leveling strike-off or screed members in such a manner that all of such members will cooperate to produce a finished surface in which the irregularities of the surface, over which the runners pass, are averaged out.

Still another object of our invention is to provide a leveling and finishing unit in a machine of the type indicated above wherein the screed or other finishing members include a center screed extending transversely between the runners and carried thereby midway between the forward and rear ends thereof and rear angularly disposed screeds disposed rearwardly beyond the rear ends of the runners and being adjustable to direct material rearwardly laterally beyond the runners so as to produce a finished layer of material of greater width than the distance between such runners.

A further object of our invention is to provide a leveling and finishing unit of the type indicated above wherein the center screed averages out in the finished surface the irregularities of the rough surface being covered due to the fact that it is supported midway between the ends of the long runners and wherein the rear screeds are provided with means for automatically controlling their elevation which is actuated by gauges which always operate on the surface finished by the center screed so that the rear screeds will substantially duplicate the surface produced by the center screed and, therefore, the strip of material produced by the machine will have substantially the same longitudinal contour at any point laterally of the strip, that is, the side portions of the strip produced by the rear screeds will substantially match the center portion of the strip produced by the center screed.

An additional object of our invention is to provide a leveling and finishing unit of the type indicated wherein means is provided which can be associated with either or both ends of the center screed and can be selectively operated to automatically control the elevation of either or both ends of such screed by means of a gauge operating on an adjacent fixed grade line such as a strip, curb, or form at either or both sides of the machine, so as to accurately match the edge or edges of the strip being produced with the edge of the adjacent layer, curb or form.

A further object of our invention is to provide a leveling and finishing unit of the type indicated above wherein the rear screeds are so supported that they can be adjusted quickly and easily by an operator to vary the width of the layer of material produced by the machine, the adjustment being accomplished with such ease as to insure the supplying of the exact amount of material necessary to match the edge of one strip with the adjacent edge of another strip even if the latter edge is irregular.

A further object of our invention is to provide a machine of the type indicated wherein the runner members of the finishing and leveling unit, in the preferred form of our machine, are so arranged relative to the tractor unit and the finishing and leveling unit is so connected to the tractor unit that the runners can be of maximum length, so as to more effectively bridge irregularities in the surface being covered, without extending substantially the overall length of the machine.

A still further object of our invention is to provide a leveling and finishing unit of the type indicated, which in its preferred form, has means associated therewith for positively feeding a sufficient quantity of material rearwardly beyond the center screed into association with the rear screeds and means associated therewith for adjustably varying the amount of material fed to each rear screed.

Another object of our invention is to provide a leveling and finishing unit of the type indicated wherein the rear screeds are suspended from the rear end of the tractor unit by hydraulic means which are actuated by the control gauges that operate on the finished surface produced by the center screed and wherein the ends of the center screed are normally suspended from the runners by manually adjustable means but by a simple adjustment may have either or both ends suspended by hydraulic means from the runners so that the elevation of the end or ends of the center screed can be controlled by a gauge or gauges running on a fixed grade line along one or both sides of the machine.

A further object of our invention is to provide a machine of the type indicated wherein hydraulically actuated hoisting means is provided in association with the tractor unit and leveling and finishing unit which can be selectively actuated either to suspend the leveling and finishing unit completely from the tractor unit for transportation or to lower the leveling and finishing unit into working position.

An additional object is to provide a hydraulic system of the type indicated above which is provided with novel valve means for preventing dropping or settling of certain hydraulically suspended units of the machine in case of failure of hydraulic pressure in the system to prevent damage to such units and damage to the finished surface already provided by the machine.

A further object of our invention is to provide a machine of the type indicated wherein the leveling and finishing unit preferably has an oscillating cutter bar associated with the center screed and each rear screed thereof, all of said cutter bars being provided with driving means driven from the power unit of the tractor unit by a flexible drive which does not interfere with vertical movement of the tractor unit or vertical movement of the leveling and finishing unit, the flexible drive also not interfering with the adjustment of said screeds on the leveling and finishing unit.

Another object of our invention is to provide a driving arrangement for the cutter bars of the screeds which can be selectively actuated to stop oscillation of the cutter bars of all the screeds, produce oscillation of the cutter bars of all the screeds, or produce oscillation of the cutter bar of the center screed and the cutter bar of either one of the rear screeds.

Another object of our invention is to provide an arrangement whereby the flexible drive for the cutter bars of the screeds which extends from the power unit of the tractor also serves to drive the positive feeding means previously referred to for feeding the material rearwardly to the rear screeds, such positive feeding means taking the form of screws disposed inside the runners and extending therealong, the driving means serving to drive the screws whenever the driving means for oscillating the cutter bars is rendered operative.

An additional object of our invention is to provide a heating system carried by the leveling and finishing unit of the machine for heating both the center screed and the rear screeds and also the control gauges which slide on the finished surface, such system including a flexible duct arrangement which permits proper adjustment of such members.

Another object of our invention is to provide a screed of novel construction wherein the cutter bar is supported for oscillation in such a manner that thrust force created on it as it is forced through the material will not interfere with proper oscillation thereof.

Another object of this invention is to provide a screed structure of the type indicated above wherein the supporting means for the cutter bar is so designed and constructed that the cutter bar can be tilted about its longitudinal axis so as to vary its compressive action on the material with which it engages, such adjustment also not interfering with proper oscillation of the bar.

Various other objects will be apparent from the drawings and the following description.

The tractor unit of our machine may be of the self-propelled type. The tractor unit is preferably supported by a pair of elongated crawlers which operate on the relatively rough surface to be covered and bridge the irregularities thereof so as to minimize vertical movement of the tractor unit. This tractor unit is preferably provided with an upstanding material-receiving portion or hopper at its forward end which is designed to receive material from a dump truck moving ahead and along with the tractor unit. A pair of conveyors is preferably provided in association with the hopper, one of them being arranged at each side of the tractor for conveying the material rearwardly of the tractor where it is discharged onto the surface in front of a transversely extending spreading member or agitator which is composed of reversely arranged helically disposed blades that feed the material transversely in opposite directions across the surface and serve to break up lumps and fluff the material. Each of the two conveyors and the spreading member is preferably provided with an independently controllable drive, which is driven from the power unit of the tractor unit, so that it is possible to obtain proper distribution of the material across the surface to be covered. Also, to facilitate steering of the tractor unit, each of the crawlers is provided with an independently controllable drive from such power unit. In addition, we provide a flexible drive between the power unit of the tractor and the leveling and finishing unit for driving certain members, which will be referred to later, on the latter unit. This flexible drive will not interfere with relative vertical movement of the two units.

The leveling and finishing unit is disposed in trailing relationship to the tractor unit and is connected thereto by draught means in such a manner that it is dragged along thereby. However, the connection is such that if the tractor unit is moved vertically by its passage over irregularities of the relatively rough surface to be covered, such vertical movement will not be transmitted to the finishing and leveling unit. Furthermore, the latter unit can function to perform its leveling action when it may have slight vertical movement, without interfering with the tractor unit.

The trailing leveling and finishing unit comprises a pair of elongated, laterally spaced equalizing runner members which extend longitudinally at opposite sides of the tractor unit directly within the crawlers. These runners are so disposed that their forward ends extend just slightly beyond the forward end of the tractor and their rear ends terminate just at the rear end of the frame of the tractor. The runners slide along the relatively rough surface to be covered but due to their length bridge the irregularities thereof. The runners are connected to the tractor unit in such a manner that any vertical movement of the tractor caused by its passage over the rough surface to be covered will have no effect on the leveling and finishing unit of which the runners form a part. This connection is made in a special manner so that even though the runners are long, the overall length of the machine will not be increased by an undesirable amount. To provide such a connection, a pair of upstanding guide arms are provided at opposite sides of the leveling unit, forming a part thereof, and these arms are disposed just inside the runners and are mounted for vertical sliding movement in guideways carried at each side of the tractor unit frame. These upstanding arms must be located behind the spreading member of the tractor unit, so as to properly locate the center screed, and the runners should be pivoted thereto at the center of gravity of the runners. If the runners are long, this would bring the rear ends of the runners rearwardly to a considerable extent and, therefore, would unduly increase the overall length of the machine which is governed to a degree by how far the runners extend rearwardly beyond the tractor. Therefore, the lower ends of the arms are turned forwardly and extend forwardly to a considerable extent along each runner. The extreme forward ends of these portions of the arms are pivoted to the runners at the center of gravity thereof. By pivoting each runner at its center of gravity, there is no tendency for either end to drop into a low spot, in the surface over which it slides, because of its own weight.

The runners carry at a point midway between their ends a transversely extending center leveling member in the form of a screed member. Since the screed member is supported midway between the ends of the runners, any vertical movement of either of the ends of the runners will be minimized at the screed and, consequently, irregularities of the surface being covered will be averaged out in the surface produced by the screed. The screed will be located directly behind the screw spreading member or agitator carried by the tractor unit so as to level and finish material spread thereby, the runners, which extend forwardly and rearwardly of the screw at the ends of the screw and center screed, serving to limit the spreading of material laterally. The upstanding arms used in connecting the runners to the tractor unit carry a transversely extending beam which forms the forward portion of a screed supporting frame. Mechanical suspending means is associated with each end of such beam for suspending it from the adjacent arm. The center screed is carried directly behind and below the supporting beam on the screed-supporting frame. The mechanical suspending means is manually adjustable so as to adjust the elevation of either end of the beam and, therefore, of either side of the forward end of the screed frame. Hydraulically operated suspending means is also provided at each end of the supporting beam for suspending it from the associated arm and for automatically changing the elevation of the end of such supporting beam. This automatic change in the elevation of the end of the supporting beam and, therefore, in the center screed is accomplished by the action of a control gauge member which operates on a fixed grade line at the adjacent side of the machine, for example, a gauge pan operating on a layer previously produced by the machine. This automatic control for the elevation of either end of the center screed can be rendered operative or inoperative independently at will and when operative, will serve to so automatically control the elevation of that end of the screed as to perfectly match in elevation the edge of the layer of material being produced with the adjacent edge of the layer previously produced. The screed itself is of novel structure and includes an oscillatable cutter bar. This bar is so supported that it effectively takes the thrust of material which it engages as the machine moves forwardly without interfering with the oscillation thereof. Also, the screed can be easily and quickly adjusted to tilt it about its axis so as to vary the compressive action which it exerts on the material without interfering with the oscillation thereof.

The screed supporting frame also includes a rear screed supporting frame section which has its forward end pivoted to the transversely extending screed frame supporting beam for vertical swinging movement about a transverse horizontal axis and from which the center screed is suspended directly behind the beam. This frame section extends rearwardly between the runners and a substantial distance beyond the rear ends of such runners. At the rear end of this frame section, the rear leveling members in the form of screeds are carried by the frame section and are disposed in rearwardly diverging relationship. These screeds are attached to the frame section in such a manner that they can be manually adjusted both vertically and laterally. With this arrangement, the rear screeds may be adjusted initially to proper level and to obtain the desired extent of lateral feed of material at the rear of the machine. The screeds are provided with side plates at their outer ends for limiting lateral spreading of the material and producing straight edges on the strip. The screeds are usually so adjusted that they extend laterally beyond the runners and crawlers so as to produce a strip of greater width than the spacing of the runners. The rear screeds are similar in structure to the center screed and include the oscillatable cutter bars. The ends of the center screed terminate short of the runners to permit material to feed rearwardly past the ends of such screed as the machine goes along. The pivoted section of the frame carries depending plates or aprons which extend rearwardly from the main screed parallel with the runners and which cooperate therewith to provide rearwardly extending passageways for conducting the material, which bleeds back past the end of the center screed, to the inner ends of the rear screeds. These passageways are preferably provided with longitudinally extending rotatable screws carried by the frame section which will positively feed the material rearwardly to the rear screeds. A flexible drive from the tractor unit extends to the cutter bar of the center screed and to the cutter bars of the rear screeds as well as to the feeding screws carried by the pivoted frame section. This drive is such that it permits the relative movement of the tractor unit and leveling and finishing unit and the pivoting movement of the screed-supporting section as well as all necessary adjustments of the screeds. This drive is so controlled that the drive to all the cutter bars can be rendered operative or inoperative and when operative, the drive to either of the rear screed cutter bars can be interrupted. Whenever the cutter bar drive is operative, the feed screws are also rotated.

The pivoted screed-supporting frame section is suspended at its rear portion by hydraulic means from the rear ends of the tractor unit. This hydraulic means is automatically controlled by control gauges or pans which operate at all times on the finished surface produced by the center screed. Since these pans operate on the surface formed by the center screed, the elevation of the rear screeds will be so controlled automatically that the side portions of the strip which they produce will conform in longitudinal contour substantially to the center portion of the strip produced by the center screed. Since all the screeds are supported on the screed frame which, in turn, is supported at its forward end from the runners and at its rear end from the tractor frame, the screeds do not support any substantial weight at the machine on the layer of material being formed.

All of the screeds are preferably heated to facilitate handling of bituminous material. This heating is accomplished with a heater carried by the pivoted frame section and connected to the various screed members by flexible conduits so as not to interfere with proper vertical movement and the various adjustments of the screed members. The control pans preferably are heated by flexible heat-conducting conduits associated therewith.

It will be apparent that with our machine, the center screed, since it is carried at the forward end of the pivoted screed-supporting frame which is supported at the center of the equalizing runners, will produce a surface in which the irregularities of the surface being covered are averaged out by the elongated runners. Since the runners are connected to the guide arms which are mounted on the tractor for vertical movement, any vertical movement of the tractor will have no effect on the runners and the center screed. Although the frame section which supports the center and rear screeds is suspended from the tractor unit, any vertical movement of the rear end of the tractor will have no effect on the surfaces produced by the rear screeds since the elevation of the rear end of the screed frame and such screeds are automatically controlled in accordance with the elevation of the surface produced by the center screed. The rear screed members may be adjusted in and out quickly on the frame by an operator to vary the width of the strip being laid by the machine or to properly merge the strip being laid with the adjacent edge of a strip previously laid. In some instances, it may be desirable to have only one of the rear screeds extend out beyond the adjacent runner. If so, the other screed will be adjusted to a point just within the runner and block-off means at the adjacent end of the center screed will be actuated to prevent material from feeding back to the rear screed. The block-off means may be also adjusted to independently control the amount of material fed back to each of the rear screeds during the use of one or both of such screeds.

We also provide means for suspending the entire leveling and finishing unit from the tractor unit for moving the machine from the location to another. This means includes hydraulic means associated with the guide arms which connect the runners to the tractor for lifting the arms and therefore lifting the runners until they are suspended completely from the tractor unit. In the hydraulic system of the machine, we also provide a safety valve which prevents dropping or settling of the hydraulically suspended rear end of the frame carrying the rear screeds in case of failure of hydraulic pressure or a substantial reduction of such pressure. This prevents injury to parts extending below such frame and to the finished surface produced by the machine.

The preferred embodiment of our invention is illustrated in the accompanying drawings wherein similar characters of reference designate corresponding parts and wherein:

Figure 1 is a side elevational view of a road-paving machine constructed in accordance with our invention.

Figure 2 is a rear-end elevational view of the machine.

Figure 3 is a plan view of the machine.

Figure 6 is a plan view of a portion of one side of the machine with parts broken away, and illustrating mainly how the side gauge pan, used in controlling automatically the elevation of the adjacent side of the screed frame is mounted.

Fig. 6a is a transverse section taken on line 6a—6a of Figure 6 through the forward portion of a runner showing it is connected to the tractor frame.

Figure 6b is a detail in perspective of a block-off plate and associated parts.

Figure 7 is a side elevational view of the structure shown in Figure 6.

Figure 8 is a detail in plan illustrating the rear portion of the pivoted screed-supporting frame section showing one of the rear screeds supported thereby and showing the associated control arrangement including the gauge pans which operate on the surface produced by the center screed.

Figure 9 is a vertical sectional view taken substantially along line 9—9 of Fig. 8.

Figure 10 is a vertical sectional view through one of the control valves of the type associated with the screeds and actuated by the gauge pans to control the elevation of the screeds.

Figure 11 is a similar sectional view taken substantially at right angles to that of Figure 10.

Figure 12 is a front elevational view, partly broken away, of the center screed and associated parts.

Figure 13 is a transverse sectional view taken through the screed of Figure 12 along line 13—13.

Figure 14 is a plan view of the screed structure of Figure 12.

Figure 15 is a front elevational view, partly broken away, of one of the rear screeds.

Figure 16 is a plan view of the screed structure of Figure 15.

Figure 17 is a transverse sectional view taken through the screed of Figure 15 along line 17—17.

Figure 23 is a detail in perspective of the structure illustrated in Figures 18 to 22.

Figure 24 is a detail in perspective of the pivot connection between a runner and a guide arm.

Figure 25 is a vertical sectional view through a portion of one of the screed structures illustrating the thrust bearing for the oscillatable cutter bar and the means for tilting the cutter bar about its longitudinal axis.

Figure 26 is a horizontal sectional view taken along line 26—26 of Figure 25.

Figure 27 is a schematic view in plan of the entire machine illustrating how the machine functions.

Figure 30 is a schematic view of the hydraulic system of the machine.

Figure 31 is a diagrammatic view of the fuel system for the screed heater of the machine.

Figure 32 is a sectional view of a safety valve used in the hydraulic system to prevent dropping of the hydraulically suspended rear end of the screed-supporting frame in case of failure or substantial reduction of hydraulic pressure.

Figure 33 is a side elevational view, partly broken away, of a modified form of our machine.

Figure 34 is a rear end elevational view of the machine of Figure 33.

Figure 35 is a plan view of the machine illustrated in Figures 33 and 34.

Figure 4:
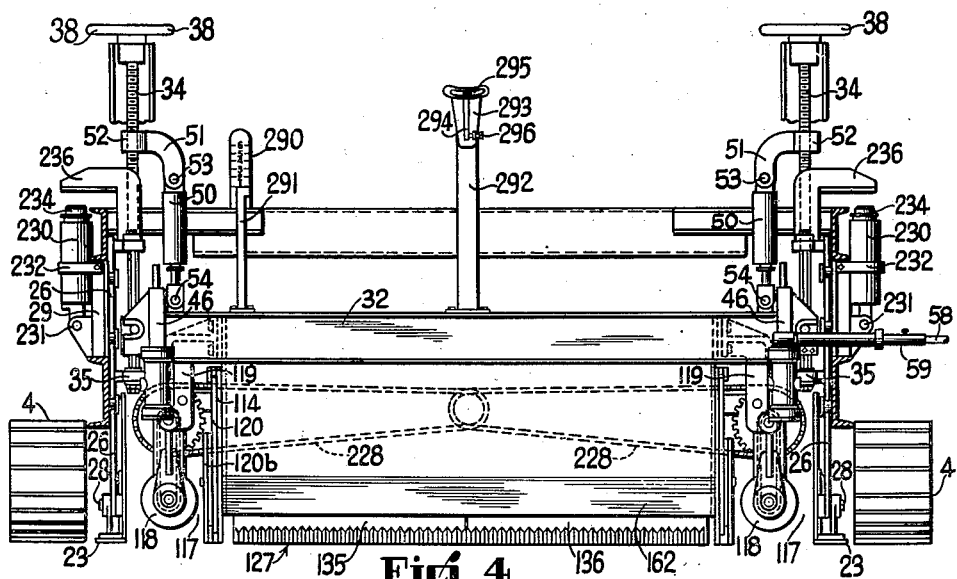
Figure 4 is a transverse vertical sectional view taken along line 4—4 of Figure 3.

With reference to the drawings, in Figures 1 to 3, inclusive, we have illustrated generally a road-paving machine constructed according to our invention. The machine comprises the tractor unit 1 and the trailing leveling and finishing unit 2 which is associated therewith. The tractor unit 1 preferably is of such type that it will receive material at its forward end from a dump truck along with which it will move, carry it rearwardly and deposit it on the surface to be covered in position to be acted on by the unit 2. The unit 1 will travel on the relatively rough surface to be covered while the unit 2 will engage the surfacing material and produce the desired finished surface thereon at the proper level.

The tractor unit 1 is self-propelled by means of an engine 3 preferably of the internal combustion type located at the rear end of said unit. This unit is supported by a pair of elongated crawlers 4 which operate on the relatively rough surface to be covered and which, because of their length, will bridge irregularities thereof and will minimize vertical movement of the tractor unit. The forward end of this unit is provided with an upstanding material-receiving portion or hopper 5 (Figures 1 and 2) which is designed to receive material from a dump truck properly associated with the machine. A pair of endless flight conveyors 6 are provided in the bottom of the hopper (Figure 1) and are arranged at each side thereof, being separated by a peaked plate 7 which extends longitudinally of the hopper. These conveyors extend from the forward end of unit 1 substantially to the rear end thereof, and are for the purpose of conveying the material rearwardly of the tractor where it is discharged onto the surface to be covered. The material discharged onto the surface will be engaged by a transversely extending spreading member or agitator 8. This agitator is rotatably carried by the tractor unit 1 at the rear side of the frame thereof and is disposed at a level slightly above the surface on which the material is deposited. The spreading member 8 is composed of a single unit but has the agitator blades 9 thereof arranged helically in right and left-hand sections so as to feed the material in opposite directions across the surface. Thus, the spreading member 8 will spread the material, discharged onto the surface by the conveyor 6, across the surface before the material is engaged by the leveling and finishing unit 2 and will also serve to break up lumps and fluff up the material.

Figure 28:
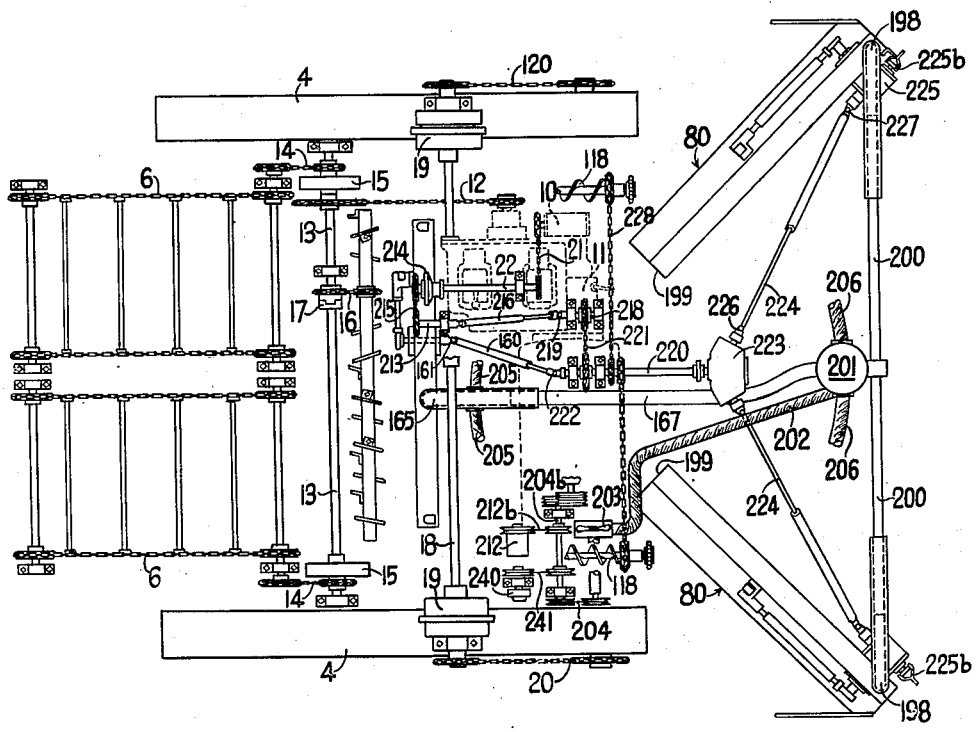
Figure 28 is a diagrammatic view in plan illustrating the driving means for the various units of the machine.
Figure 29:
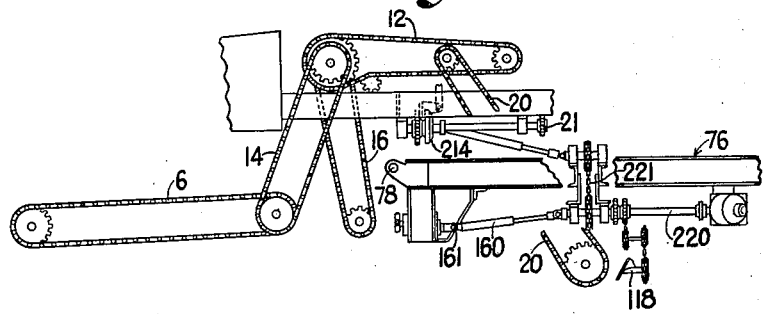
Figure 29 is a diagrammatic view of the driving means in side elevation.

As shown best in Figures 28 and 29, driving means is preferably provided on unit 1 for driving the crawlers 4 independently, for driving the conveyors 6 independently, and for driving the spreading member 8 independently. The independent drive of the crawlers 4 permits steering of the tractor unit. The independent drive of the conveyor 6 and spreading member 8 permits complete control of the distribution of the material across the surface. The driving mechanism includes the transmission 10 which is driven from the engine 3 by means including a main clutch 11. The unit 10 drives a forwardly extending chain and sprocket drive 12 which drives a transversely extending drive shaft 13. A downwardly and forwardly extending sprocket and chain drive 14 is associated with each end of the shaft 13 and is driven therefrom through the medium of a clutch 15 associated with the shaft. The clutches 15 may be independently controlled to selectively actuate either of the conveyors 6. A rearwardly and downwardly extending chain and sprocket drive 16 extends from an intermediate portion of the shaft to the spreading member 8 and a clutch 17 is associated with the drive 16 on the shaft 13 and can be independently controlled so that the member 8 may be rotated or rendered inoperative. Extending in opposite directions from the transmission 10 are the crawler driving shafts 18. Each of these shafts extends laterally to a point over its associated crawler and at this point carries a clutch 19. Each shaft 18 through its clutch 19 drives a downwardly and rearwardly extending chain and sprocket drive 20 which, in turn, drives the associated crawler 4. Thus, the clutches 19 may be independently actuated to render either of the crawler drives operative or inoperative. The transmission 10 also drives through the medium of a sprocket drive 21 a short forwardly extending shaft 22. This shaft 22 is adapted to drive various members on the leveling and finishing unit 2 which will be referred to specifically hereinafter.

The leveling and finishing unit 2 is disposed within the crawlers 4 and the main part thereof is disposed in trailing relationship to the tractor unit 1 as shown in Figures 1 and 3. The unit 2 is connected to the unit 1 in such a manner that it is dragged along thereby but substantially free relative movement of the two units is permitted. Thus, when the tractor unit 1 is caused to move vertically by passing over irregularities of the relatively rough surface on which the crawlers 4 operate, such vertical movement will not be transmitted to the finishing and leveling unit 2. Furthermore, the latter unit can function in the manner described below to perform its leveling action without interfering with the tractor unit 1 because of this type of connection.

The leveling and finishing unit as shown best in Figures 1 to 3, inclusive, comprises a pair of elongated, laterally spaced, equalizing runner members 23 which extend longitudinally on opposite sides of the tractor unit directly within the crawlers 4. These runners 23 are fabricated from suitable plates of metal and are vertically disposed, the runners being so arranged relative to the unit 1 that their forward ends extend just slightly beyond the forward end of the tractor frame and their rear ends terminate at the rear end of the tractor frame. These runners support all of the leveling members of the leveling finishing unit 2 which in the drawings are shown as screed members. However, it is to be understood that for certain types of machines, strike-off plates would be suitable as the leveling members. The runners 23 (Figure 1) have flat shoes 24 along their lower edges and upturned forward ends 25 so as not to dig into the surface over which they slide, the runners sliding along the relatively rough surface to be covered but due to their length bridging the irregularities thereof.

The runners 23 are connected to the tractor unit by a special connection, which is illustrated best in Figures 6, 7 and 18 to 24, inclusive, in such a manner that any vertical movement of the tractor unit 1 caused by its passage over the rough surface to be covered will have no effect on the leveling and finishing unit 2 of which the runners 23 form a part. With this particular type of connection, even though the runners are long, the over-all length of the machine will not be increased by an undesirable amount and the runners can still be pivoted for vertical rocking movement about points substantially coinciding with their centers of gravity. To provide this connection, a pair of upstanding guide arms 26 (Figures 7 and 23) are provided at opposite sides of the unit 2 and form a part thereof. These upstanding arms 26 must be located behind the screw spreading member 8 so as to properly locate the center screed behind such member. They are disposed directly behind the hopper and just inside the runners 23. As indicated above, it is important for the runners to be pivoted to the arms at the centers of gravity of the runners in order to eliminate any tendency for either end of each runner to drop into a low spot, in the surface over which it slides, because of its own weight. Therefore, if the runners are long, which obviously is desirable, this would bring the rear ends of the runners rearwardly to a considerable extent and, consequently, would unduly increase the over-all length of the machine which is governed to a degree by how far the runners extend rearwardly beyond the tractor unit 1. To eliminate increase in overall length, the lower ends of the arms 26 are turned forwardly and extend forwardly to a considerable extent along the runner. At the extreme end of each portion 27 a transverse horizontal pivot 28 is provided for connecting the runner to the arm, the pivot structure being shown best in Figure 24. Thus, it will be noted that because of the arrangement of the guide arms 26, the runners can still be of maximum length and yet not extend to any degree beyond the forward or rearward ends of the tractor unit 1. To prevent lateral swaying of the forward end of each runner 23, an additional connection between the runner and frame and tractor frame is provided as shown in Figures 6, 6a and 7. This connection comprises bracket 28c which is welded to the inner wall of each runner and which has an angularly disposed slot 28d formed therein. Depending from the side of the tractor frame and rigidly secured thereto is a bracket 28e which extends down along the outer side of the slotted bracket 28c. This bracket 28e carries a pin 28f at its lower end which extends laterally into slot 28d and which carries a washer 28g at its inner end. Contact of bracket 28c with adjacent bracket 28e prevents lateral outward movement of each runner while the washer 28g contacting with the inner side of bracket 28c prevents lateral inward movement of each runner. Vertical movement of the end of the runner is permitted by pin 28f riding in slot 28d and due to the angular relationship of the slot and to the fact that the pin 28f fits loosely therein, no binding of the pin will occur during the vertical movement. Thus, lateral movement of the end of the runner is prevented but vertical movement is permitted.

Each upstanding guide arm 26 is disposed for relatively vertical movement in association with a pair of vertically disposed angles 29 which are rigidly fastened in spaced relationship to each side of the tractor frame. The angles 29 carry at their inner sides flanged rollers 30 which are arranged to form a guideway for receiving the arm 26 and for permitting vertical movement of the arm in the guideway. Thus, relative vertical movement between the tractor frame and the runners will be permitted. Furthermore, as indicated above, the runners will be permitted to pivot vertically relative to the arms 26 and tractor frame.

Midway between the forward and rearward ends of the runners 23, a transversely extending center screed 31 is provided as indicated best in Figure 3. This screed is carried indirectly by the runners 23 and arms 26 in the manner illustrated best in Figures 18 to 23. Since the screed member 31 is supported midway between the ends of the runners, any vertical movement of either end of either runer will be minimized at the screed, although vertical movement of the runners will not occur to any extent because of their length. The screed 31, as shown best in Figure 3, is located directly behind the spreading members 8 carried by the tractor unit 1 so as to level and finish material spread thereby. It will be noted that the runners 23 extend forwardly and rearwardly of the screw spreading member 8 at the ends of the spreading member and center screed 31 so as to limit the spreading of material laterally.

The screed member 31 is carried on a screed-supporting frame 33, shown in Figure 3, below and slightly behind a transversely extending supporting beam structure 32 which forms the forward portion of such screed-supporting frame. This beam 32 is suspended from the upper portions of the arms 26 by means shown best in Figure 23. This means includes a suspending screw 34 which is disposed just inside each arm 26. The lower end of this suspending screw carries a bushing 35 which is rotatable relative thereto but not threaded thereon and this bushing is anchored to an inwardly extending ear 36 carried by the arm 26 as shown best in Figures 18 and 21. The upper portion of the screw 34 passes loosely through an opening in an ear 37 projecting inwardly from the upper end of the arm 26. The upper end of each screw can be rotated by means of a handwheel 38 which is shown in Figure 4. Referring again to Figure 18, between the vertically spaced ears 36 and 37, the screw 34 is threaded through a trunnion block 39. This block is disposed for vertical movement on guide rods 41 which are anchored to the ears 36 and 37. It will be apparent that rotation of screw 34 will slide the block 39 on the rods 41. The block 39 has forwardly and rearwardly extending trunnions 42 which engage U-shaped bearings 43 formed at the outer edges of a guide member 44 which is shown in Figures 18 to 23. At its inner face this member 44 is provided with a verticaly disposed guide plate 45. This guide plate 45 fits into a guideway formed by a pair of guide brackets 46 which are bolted as at 47 to the front and rear surfaces of the beam structure 32. A removable pin 49 can be passed through plate 45 and one of the brackets 46 to prevent relative vertical movement of plate 45 and the end of the beam structure 32. It will be apparent that with this structure, when the screw 34 at either end of the beam 32 is rotated, that end of the beam will be raised or lowered, the end of the beam pivoting around the trunnions 42 during this adjustment. Thus, either end of the beam 32 and either side of the forward end of frame 33 can be mechanically adjusted to adjust the elevation of either end of the center screed 31.

Additional suspending means is provided for each end of the beam structure 32 so as to control its elevation and that of the adjacent side of frame 33 automatically when desired. This means is in the form of a hydraulic ram 50 located at each end of the beam 32. The cylinder of ram 50 is suspended from the screw 34 by means of a bracket 51 which has a vertical sleeve 52 through which the screw is threaded. This bracket 51 is pivoted at 53 at its lower end to the upper end of the ram 50. The lower or piston end of the ram is pivoted at 54 to the end of the beam structure 32. The ram 50 receives hydraulic fluid in its lower end through a line 55 which serves to cause it to lift and support the beam 32. The weight of beam 32 and associated parts will cause lowering of such parts whenever the fluid is exhausted from the ram through the line 55. The ram will have no function whenever the removable pin 49 is in place since this will lock the end of the beam to the plate 45. However, when the pin is removed, the ram can function as indicated, to move the end of the beam 32 vertically on the plate 45 and, in other words, to move the end of the screed 31 relative to the runners 23.

When plate 45 is locked to the end of the beam 32 by pin 49, rotation of screw 34 causes the screw to thread through sleeve 52 at the same rate as through block 39 thereby raising or lowering the end of the beam 32 without having any effect on the ram 50. Therefore, the screws can initially adjust the end of the beam 32 and the screed 31 carried thereby to the proper level relative to the supporting runners. This will determine the thickness of the layer of material produced by the machine and one end may be elevated higher than the other in accordance with the crown to be produced in the road or in order to change the crown of an existing road. Either one or both of the rams 50 may be used when the strip being produced is to match another previously formed strip at one or both sides of the machine or a curb at one or both sides of the machine. When either ram is to be used, the pin 49 is removed and the ram at that side can function without disturbing the original setting of the screw 34.

When either ram 50 functions, it is automatically controlled by means of a control valve 56 carried at the adjacent end of the beam 32 by means of a bracket 56b bolted to one of the guide brackets 46, this valve being connected to the ram 50 by means of the line 55. For actuating the valve 56 the structure illustrated best in Figures 6 and 7 is provided. This structure comprises a telescoping shaft 57 which extends outwardly over the adjacent crawler 4 from the valve 56. This shaft 57 comprises a solid shaft portion 58 which is splined in a sleeve portion 59 and which may be adjusted in and out of such portion and held in fixed position by adjustment of a set-screw 60. The sleeve portion 59 of the shaft is rotatably mounted in a sleeve 61 which is supported by a bracket 62 (Figures 19 and 20) which is attached to the bracket 44. The inner end of the shaft portion 59 carries a rocker arm 63 as shown best in Figures 6 and 19. This rocker arm is connected by a pin and slot connection 64 to the upper end of the stem 65 of the valve 56. As shown in Figure 7, the outer end of the shaft section 58 has a rocker arm 66 keyed thereon. This arm is connected by a rod 67, including an adjustable turnbuckle, to the rear end of a control gauge pan 68 to which it is pivoted, as at 69. The pan 68 is also connected at the pivot 69 to the rear end of a drag link 70 which extends forwardly and upwardly to a shaft 71 where it is pivotally mounted, the shaft 71 extending outwardly from the crawler frame and being supported thereon by means of a depending bracket 72. The pivotal connection of the end of link 70 to the shaft 71 includes a sleeve 73 (Figure 6) which is slidable in and out on the shaft 71 in accordance with the adjustment of the telescoping shaft 58. The forward end of the pan 68 is suspended from the arm 70 by means of an adjustable chain suspension 74. The height of the control pan 68 may be initially set by adjustment of rod 67 and chain 74. It will be noted that the ends of the pan 68 are upturned as at 75 to prevent digging into the material. The control pan 68 at either side of the machine will ride on a predetermined grade line, such as a strip previously formed, a curb, et cetera, and will control the valve 56 through the rocker arms 66 and 63 and connecting parts. Actuation of the valve 56 will control supply of fluid to and exhaust of fluid from the ram 50.

It will be apparent that during either the mechanical adjustment of one end of the beam structure 32 or the automatic adjustment of the end of such structure, the opposite end will pivot about the trunnions 42 at such end.

Figure 5:
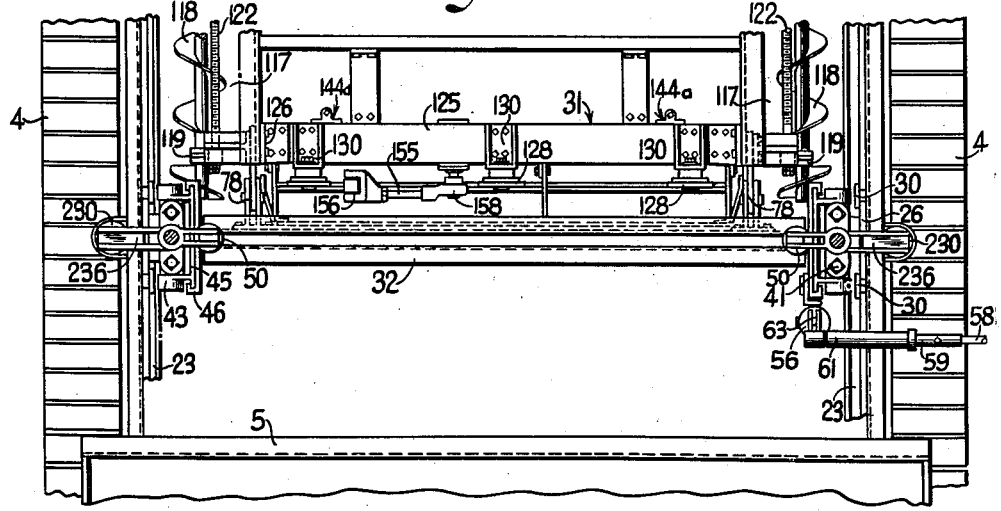
Figure 5 is a plan view of a portion of the machine showing the center screed and the forward portion of the frame section which carries it and the rear screeds.
Figure 18:
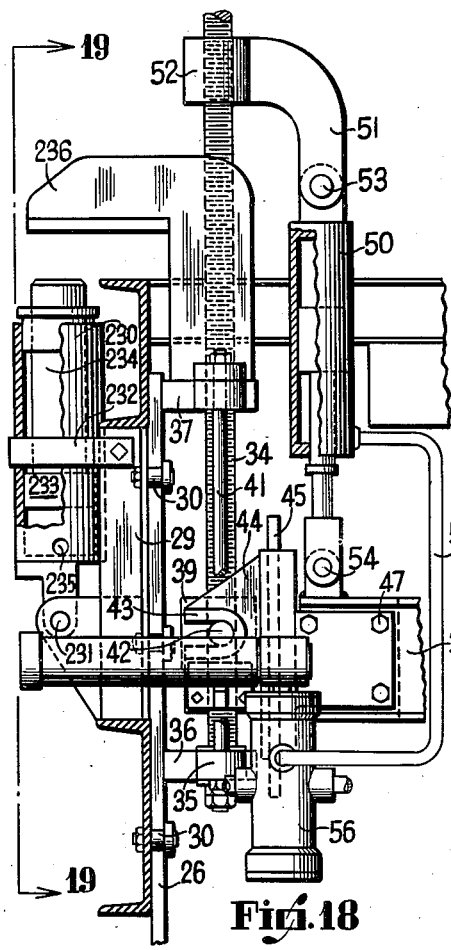
Figure 18 is a detail, mainly in elevation, of the means for suspending the screed-supporting frame from the upstanding guide arms used in connecting the runners to the tractor unit frame.
Figure 19:
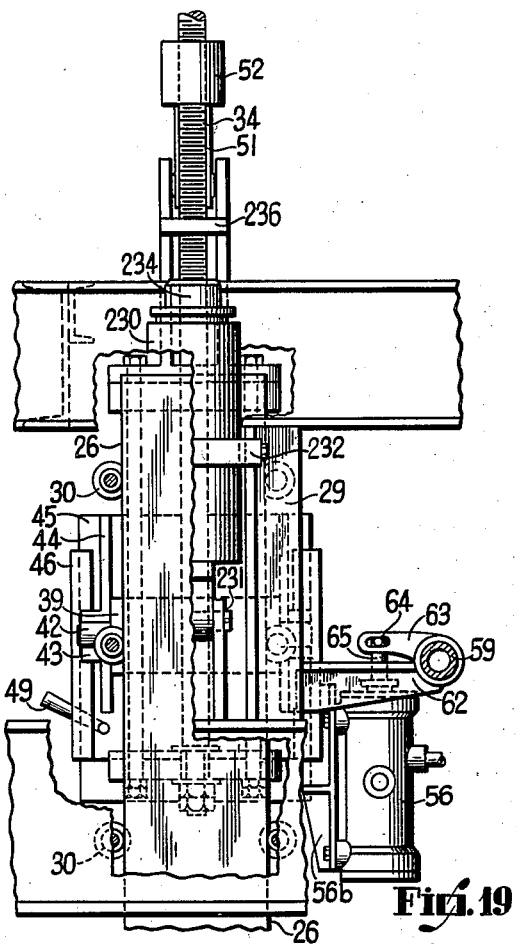
Figure 19 is an elevational view of the structure of Figure 18 taken substantially along line 19—19 of Figure 18.
Figure 20:
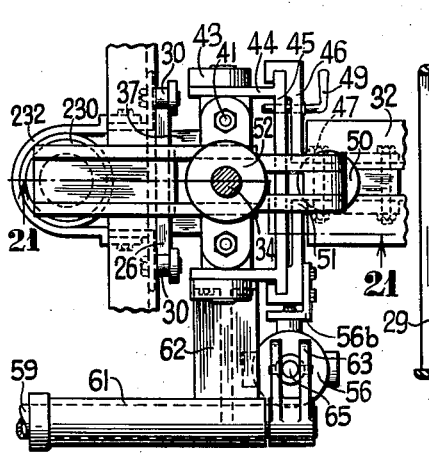
Figure 20 is a plan view of the structure of Figure 18.
Figures 21, 22:
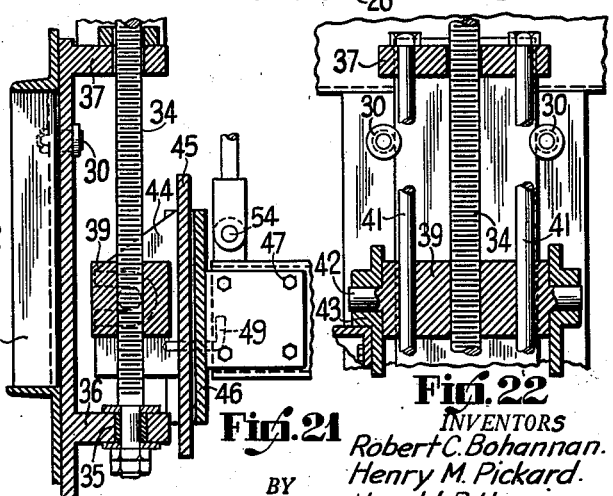
Figure 21 is a vertical sectional view taken along line 21—21 of Figure 20.
Figure 22 is a sectional view taken along line 22—22 of Figure 20.

The screed supporting frame 33 also includes a pivoted rear screed supporting section 76. The general arrangement of this section 76 is illustrated best in Figure 3. This section 76 includes the longitudinally extending beams 77 which are disposed in laterally spaced parallel relationship. Each of these beams 77 is spaced a substantial distance inwardly of the adjacent runner 23 and is parallel thereto. Each beam 77 extends from the transverse supporting beam 32 rearwardly a substantial distance beyond the rear ends of the runners and the tractor frame. As shown best in Figures 5, 6 and 7, the forward end of each of the beams 76 is pivoted by a horizontal transverse pivot 78 to the rear side of the supporting beam 32. The members 77 are connected together by a plurality of transverse beams 79 to form a complete frame section. It will be noted that this frame section can swing vertically about the pivots 78. At the rear end of this frame section 76, a pair of rear screeds 80 are supported. These screeds 80 are disposed in rearwardly diverging relationship and are attached to the frame section in such a manner that they can be manually adjusted both vertically and laterally. The structures for attaching the center screed 31 and the rear screeds 80 to the pivoted frame section 76 will be described in detail hereinafter.

The rear portion of the pivoted frame section 76 is suspended from the tractor frame by means of the hydraulic rams 81 which are shown best in Figures 1, 2 and 3. Each of these rams 81 has its piston pivotally connected at 82 to a bracket 83 extending from the upper portion of the tractor frame at the rear end thereof. The lower end of the cylinder of each ram is pivotally connected at 84 to a bracket 85 attached to the beam member 77 of the frame section 76. It will be noted that the rams 81 are connected to the frame section 76 rearwardly beyond the midpoint of the length thereof or, in other words, are connected to the rear portion of the frame section. Hydraulic fluid is supplied to each of the rams 81 above its piston and is exhausted therefrom by means of a line 85. Each of these lines 85 is controlled by a valve 86 which is identical with the valves 56. Hydraulic fluid is supplied to the upper ends only of the rams 81 so as to lift and support the rear end of the frame section 76. Lowering of the frame is accomplished by the weight of the frame when hydraulic fluid is exhausted from the upper ends of the rams.

Each of the valves 86 is controlled automatically by control gauges which operate on the surface formed by the center screed 31. For this purpose each of the valves is connected to a control arm 88 which is illustrated best in Figures 1, 8 and 9. It will be noted that the valve 86 is rigidly carried by one of the transverse members 79 of the frame and is vertically disposed, being supported by a bracket 89 bolted to the member 79. The stem 90 of the valve extends upwardly and is connected by a universal joint 91 to the lower end of a screw 92 that is threaded through the arm 88, as indicated at 93. The upper end of the screw 92 carries a handwheel 94 by means of which it may be rotated. The arms 88 will always be substantially horizontally disposed and the height of each arm relative to the associated valve 86 may be adjusted initially by rotating the handwheel 94.

As indicated best in Figure 3, the arms 88 are disposed in angular relationship to the associated screeds 80 diverging at their forward ends and converging towards each other at their rear ends. The forward end of each arm 88 is supported by a control gauge pan 95 while its rear end is supported by a control gauge pan 96. The pan 95 is carried on the lower end of an arm 97 which is rigidly connected to the forward end of the arm 88. The pan 96 is carried on the lower end of a vertical arm 98 which has its upper end rigidly connected to the rear end of the arm 88. The lower end of arm 98 is rigidly bolted at 99 to an upstanding bracket 100 on the top surface of the pan 96 at the rear end thereof. The forward end of the pan 96 is provided with upstanding lugs 101 which are pivoted at 102 to the forwardly extending drag links 103 which have their forward ends pivoted at 104 to the forward end of a bracket 105. The vertical portion of this bracket 105 is rigidly bolted at 106 to the rearwardmost transverse member 79 of the pivoted frame section 76. A bolt 107 extends upwardly from the pan 96 loosely through an opening in the horizontal part of the bracket 105. This bolt carries lock nuts 108 on its upper end. The bolt 107 permits upward vertical movement of the forward end of the pan but limits downward movement thereof. Thus, digging of the forward end of the pan into the material is precluded by the bolt 107 which may be adjusted to raise the forward end of the pan slightly. Both ends of the pan are upturned to aid in preventing digging into the material as indicated at 109. The pan 95 is similar to the pan 96 and is similarly supported on the arm 97. Its rear end is rigidly connected by the upstanding bracket 110 to the lower end of the arm 97 by a bolt connection 111. The forward end of the pan is provided with a drag link structure 112 which is like the structure 103 and which is connected to a horizontal bracket 113. However, in this instance the bracket 113 is carried adjacent the lower edge of a vertically disposed apron or plate 114 carried by the frame section 76.

As shown best in Figure 27, the center screed 31 does not extend the full width of the space between the runners 23. The forward pans 95 will slide over the surface of the layer of material formed by the screed 31 adjacent the edges of the strip formed by the screed. Since the control arms 88 converge towards their rear ends, the rear pans 96 will operate at points spaced inwardly of the pans 95 and also on the surface produced by the center screed. Even when the rear screeds 80 are adjusted inwardly as far as possible, as shown by dotted lines, the rear pans 96 will operate on the surface created by screed 31 and at least a part of the surface over which each pan 96 slides will not have been contacted by the rear screed at that side, thus all pans 95 and 96 operate at all times on surfaces created by the center screed 31. Any vertical movement of either end of each arm 88 caused as the pans 95 and 96 slide along on the surface produced by the center screed will actaute the associated control valve 86. Actuation of such valve will, in turn, actuate the ram 81 at that side of the machine and either raise or lower the rear portion of the frame 76 at that side, the frame pivoting about the forward pivots 78. The valve 86 on each arm 88 is intermediate the ends of the arm and substantially midway between the forward and rear ends of the associated screed 80 in its normal position. Longitudinal separation of pan 95 from pan 96 on the same arm 88 produces a further refinement of the surface contour created by the rear screed controlled thereby through the averaging action gained by so supporting the pans on opposite ends of the lever arm with the valve 86 intermediate such arm.

It will be apparent from the above that the forward end of the frame 76 is so supported on the runners 23 that either side of the frame at its forward end may be adjusted vertically either manually under the control of one of the hand wheels 38 or automatically under the control of one of the valves 56 and associated ram 50. The rear portion of the frame 76 will be adjusted automatically vertically about the pivot 78 by means of the pans 95 and 96 which control the valves 86 independently, the valves controlling the ram 81 independently. This automatic adjustment will be in accordance with the surface produced by the center screed 31 since the pans 95 and 96 slide thereon.

As previously indicated, the ends of the screed 31 terminate short of the adjacent runners 23. This permits some of the material spread by spreading member 8 to bleed back past the ends of the screed as shown best in Figure 27 and to eventually reach the rear screeds 80. The forward ends of these screeds 80 always extend inwardly beyond the outer ends of screed 31 while the outer ends may be adjusted to different lateral positions usually beyond the runners 23 as shown in this figure. To insure that a sufficient quantity of material reaches the rear screeds 80, positive means is provided for feeding the material that bleeds back past the end of screed 31 to the rear screeds 80. It will be noted best from Figures 3, 4, 6b and 27 that the aprons 114 previously referred to are carried by the side beams 77 of the frame 76 and depend therefrom, being disposed in substantially parallel relationship with the runners 23 and extending rearwardly from the ends of the screed 31 which they overlap. The aprons 114 are rigidly secured to beams 77 and depend therefrom. The aprons 114 will cooperate with the adjacent runners 23 to form rearwardly extending material directing passageways 117 which are closed at their sides but open at their forward and rearward ends.

Within each of the passageways 117 a feed screw 118 is disposed and extends longitudinally the full length thereof. This screw is carried at its ends in bearings provided in depending bracket supports 119 which are secured to the side beam 77. These screws 118 are positively driven by means which will be described later and the screws serve to positively feed the material in the channels 117 rearwardly to the rear screeds 80.

In order to prevent passage of material back past either end of the screed 31 to the adjacent screws 118, for example, when the rear screed 80 at one side is not to be used, we provide the block-off structure illustrated best in Figures 3, 6, 6b and 12. This structure comprises a longitudinally movable block-off plate or gate 120 which is vertically disposed and is carried for sliding movement against the outer side of the adjacent apron 114. This plate 120 is carried by longitudinally extending guide channels 121 secured to the outer surface of the apron 114 adjacent its upper and lower edges. For moving the block-off plate 120 longitudinally relative to apron 114 a feed screw 122 is provided. This screw is rotatably anchored to the apron 114 by means of a bearing bracket 123 which is disposed behind the rearwardmost position of plate 120. The forward end of screw 122 is rotatably carried by one of the brackets 118 which supports feed screw 117. It will be noted that the movable plate 120 is provided with an inwardly extending housing 124 which carries a nut that is non-rotatably disposed therein, the screw 122 passing through this nut. The screw 122 can be selectively rotated by means of a crank 122b and when rotated, the housing 124 will be moved axially of the screw and, consequently, the plate 120 will slide relative to the apron 114 which carries it. The plate 120 supports a vertically movable edging plate 120b by pins and slot connections 120c so that plate 120b will always be in contact with and slide along the surface. The plate 120 is normally in its rearwardmost position but can be moved forwardly until its forward end passes beyond the screed and beyond the end of the spreading member 8 in order to prevent such spreading member from feeding material laterally beyond the end of screed 31. At this time, the plate 120b serves as a side form for limiting lateral spreading of the material beyond the end of the main screed. As illustrated best in Figure 27 either or both of the plates 120 may be moved into blocking-off position to prevent feed of material rearwardly past the ends of the center screed 31. When frame 76 is raised for transportation chains 120d may be used for hitching plate 120b in its uppermost position.

The center screed structure 31 is illustrated best in Figures 12 to 14, inclusive. This screed structure as previously indicated is mounted on the forward end of the frame 76 directly behind and below the pivots 78 thereof. It includes a transversely extending main support in the form of a box girder 125 which has its ends rigidly secured to the side beams 77 of the frame 76 by means of angle brackets 126 at the ends thereof which are bolted to the top surface of girder 125 and to the inner surfaces of the beams 77. The girder 125 extends the full length of the screed and the cutter bar 127 of the screed is suspended therefrom for oscillation. The suspension means includes pendulum hanger arms 128, one of which is provided at each end of the screed and another at the center of the screed. The upper end of each arm 128 is connected by means of an anti-friction pivot bearing 129 to the forward side of a supporting bracket 130 which is bolted to the upper surface of the girder 125. The lower end of each arm is bolted to a two-part bearing yoke 131 which straddles a circular bearing portion 132 provided on the upstanding plate 133 of the cutter bar. The yoke 131 and the bearing portion 132 are provided with aligning sockets for receiving portions of an anti-friction bearing through which the pivot pin 134 passes.

It will be noted from Figure 12 that the cutter bar 127 is in two sections 135 and 136 to facilitate crowning of the screed. These sections are separated at a center joint 137. Each section of the cutter bar includes the outstanding plate 133 which is suspended from the arms 128. It will be noted from Figure 14 that the bearing portions 132 of the adjacent ends of the plates 133 of sections 135 and 136 are off-set relative to each other so that one will be directly behind the other. Therefore, the yoke 131 carried on the lower end of the center arm 128 is wider so that it can straddle the double bearing portion 132.

The main part of the cutter bar 127 is in the form of a channel shape surfacing member or shoe 139. This shoe has a flat lower surface 140 and a forward toothed or serrated edge 141 which is disposed at an angle relative to the surface 140, for example at a 45 degree angle. The forward edge 141 will engage the material and when oscillated will agitate it and break up the material and direct it rearwardly under the flat surface 140 which will produce a finished surface on the material. The top portion of the channel member 139 is closed by a plate 142 welded in position so as to form a fluid conducting passageway 143.

The channel member 139 is connected to the lower edge of the suspending plate 133 by means of longitudinally spaced hinge structures 144. These hinge structures permit the cutter bar to be tilted about its axis to vary the compressed force exerted on the material. For adjusting the cutter bar about its axis, we provide a novel structure which accomplishes this adjustment without interfering with the oscillation of the cutter bar on the arms 128 and which provides proper means for taking the thrust exerted on the cutter bar as it is forced through the material. This means is illustrated best in Figures 25 and 26 and includes thrust bearing 144b provided directly behind each of the arms 128. The thrust bearing 144b is in the form of a transverse pin 145 which is secured to the rear flange of channel member 139 by angle clips 146. Engaging the forward and rearward sides of the pin 145 are channeled rollers 147 which are carried by a rearwardly extending bracket 148. This bracket is rigidly secured on the lower end of an upstanding shaft 149 of angular form. The angular portion of the shaft 149 is mounted for vertically sliding movement in a guide portion 150 formed on the lower end of a bracket 151 which is bolted against the rear face of the girder 125. The upper portion of the bracket 151 also carries a guide member 152 in which the upper threaded end 153 of the shaft 149 is mounted for free vertical movement. By means of the lock nuts 154 threaded on the upper portion 153 of the shaft above and below guide portion 152, the shaft 149 may be adjusted vertically. This will lift the roller carrying bracket 148 and will exert a lifting action on the pin 145, the pin rotating about its axis in the socket provided between the rollers 147. This action will result in lifting the rear edge of the channel member 139, causing it to pivot about the hinge connections 144. Thus the cutter bar may be tilted as desired by this arrangement. The pins 145 and rollers 147 will take the thrust exerted on the cutter bar and will still permit oscillation of the cutter bar, the pin 145 merely sliding back and forth between the rollers 147.

In order to adjust the crown of the screed, it is merely necessary to adjust the vertical position of the center bracket 130 from which the center arm 128 is suspended. This is accomplished by placing shims under the bracket 130 or removing them therefrom. This will raise or lower the adjacent ends of the cutter bar sections 135 and 136, the pivot portions 132 thereof pivoting within the associated yoke 131 about the pivot pin 134 during this adjustment.

Oscillation of the cutter bar 127 is accomplished by an eccentric structure shown best in Figures 12 and 14. This structure includes a rod 155 which is pivotally connected at 156 by a horizontal pivot to a bracket 157 which is bolted to the upstanding plate 133 of one of the sections 135 of the cutter bar. The other end of the rod is associated with an eccentric unit 158 carried by girder 125 and driven by a shaft 160 connected thereto by a universal connection 161.

It will be apparent that when the shaft 160 is driven, the rod 155 will be reciprocated and this will produce oscillation of the cutter bar 127, the arms 128 and cutter bar 127 pivoting relative to each other about the pivot 134 and the upper ends of the arms pivoting about the pivots 129.

In order to protect the arms 128 and their associated pivot structure and the eccentric oscillating drive for the cutter bar from material through which the screed advances, a guard plate 162 is provided. This guard plate is vertically disposed directly in front of the screed 131 and extends the full length thereof. It is secured to the girder 125 by forwardly extending brackets 162b which are bolted to the rear surface of plate 162 and the front surface of the girder. The spaces between the ends of plate 162 and the screed are closed by guard plates 163 (Figure 14) which are secured to the ends of the plate 161 and extend rearwardly therefrom. It will be noted in Figure 14 that the block-off plates 120 overlap these plates 163. Therefore, it will be impossible for any material to enter into the screed structure at the ends thereof. It will be noted from Figure 13 that the lower edge of the plate 162 is turned rearwardly to form an angular portion 164 which is in alignment with the angular forward edge 141 of the cutter bar 127. Thus portion 164 will direct the material downwardly and rearwardly to the serrated edge 141 of the cutter bar. A square bar 164b (Figures 25 and 26) is carried by the front surface of cutter bar 127 and extends completely therealong just above the extreme lower edge of portion 164 to prevent material from passing upwardly between the cutter bar 127 and the guide plate 164.

Heating medium is supplied to the passageway 143 in the cutter bar 127 for heating the cutter bar throughout its length. This heating medium is supplied by means of an elbow member 165 (Figures 25 and 26) which is rotatably mounted in an opening in the plate 142 intermediate the ends of each section 135 and 136 of the cutter bar. This elbow member is pivoted by a vertical pin 166 to the plate 142 so that it can oscillate upon oscillation of the cutter bar. This elbow is connected by a telescoping connection to a conduit 167 which is connected to a suitable source of heating medium to be referred to later. The end of each of the cutter bar sections 135 and 136 is provided with vent 165b to permit escape of heating medium so that it will circulate in the passageway 143.

The rear screeds 80 are substantially identical in structure with the center screed 31 and are illustrated in detail in Figures 15, 16 and 17. Each screed includes the box girder 168, the cutter bar 169 and the forwardly disposed guard plate 170. Means is provided on each of these screeds for oscillating the cutter bar and for adjusting it about its axis which is identical with the corresponding parts on the center screed.

As previously indicated, each rear screed is suspended from the rear portion of the frame section 76 by means which permits both lateral and vertical adjustment. To permit the vertical adjustment, the box girder 168 of each rear screed has an upstanding bracket 171 (Figure 15) bolted to each end thereof. These brackets 171 are connected by bolt and slot connections 172 to a forward bracket 173 and a rear bracket 174. The forward bracket 173 is provided with a sleeve portion 175 which is slidably mounted on a pipe 176 (Figure 8) which extends transversely of the frame section 76 and is carried by the beams 77 thereof at a point closely adjacent to the location of the hydraulic rams 81. Each rear bracket 174 is provided with a split collar portion 177 which is clamped on the outer end of a pipe section 178. The inner end of this pipe section 178 telescopes within the end of a pipe 179 which is disposed at the extreme rear end of the frame 76 and extends transversely thereof, being supported by the beams 77. A substantially L-shaped arm 180 rigidly connects each forward bracket 173 to the rear bracket 174. To move either of the brackets 171 vertically relative to its associated bracket 173 or 174, an adjusting screw 181 is provided. The adjusting screw is rotatably anchored at its lower end to a lug 182 formed on bracket 171 while its upper portion is threaded through the horizontal portion of the bracket 173 or 174. The screw may be rotated by means of a knob or head 185. Obviously either end of the screed may be vertically adjusted by rotating the proper member 185, the opposite end of the screed pivoting about the axis of the pipe which supports it.

This arrangement not only provides for vertical adjustment of either end of each rear screed but also provides for lateral adjustment of the screed as a unit. This adjustment for each screed is accomplished by means of an adjusting screw 186 which has its inner end rotatably anchored at 187 to a longitudinally extending portion of the arm 180. The screw is also threaded through a sleeve portion 188 which is formed on the outer end of a laterally extending bracket 189 which has its inner end rigidly attached at 190 to the rear end of the beam 77 of the frame 76. Each screw 186 may be rotated by means of a hand wheel 191. Rotation of either of the hand wheels 191 will rotate the corresponding screw 186, moving the arm 180 laterally and, consequently, moving laterally the rear screed that is suspended from the brackets 173 and 174 carried thereby. During this movement the sleeve 175 of bracket 171 slides on pipe 176 and the pipe section 178 at the rear slides in the larger pipe 179.

As previously indicated, material is fed back to the rear screeds by the screws 119. This material is supplied to the forward side of each rear screed at its inner end, such inner end always being so disposed that it extends inwardly beyond the screw and the passageway 117. The cutter bar of the rear screed being oscillated will engage the material supplied to such screed and will act thereon in the same manner as the cutter bar of the screed 31. As the machine moves along the material will feed rearwardly and laterally towards the outer end of each rear screed. To limit outward feeding of this material, each rear screed is provided with a side plate 192 (Figures 3 and 8) which carries a vertically movable plate 192b that forms a straight edge on the layer of material being acted on by such screed. The plate 192 is disposed in parallel relationship to the runners 23 and is carried on the screed by brackets 193 and 194. The forward bracket 193 is connected to the face of the guard plate 170 of the rear screed while the rear bracket 194 is connected to the outer end of the box girder 168 of the screed. Plate 192b is carried for relatively free vertical movement on plate 192 by vertical guides 193b and 194b supported on the ends at plate 192. Obviously, this plate 192b always will have its lower edge sliding along the surface and it is provided with a flat runner edge 192c. Since plate 192 is carried by the screed, it will move with the screed vertically and laterally during the adjustments of the screed. Chains 192d may be used for hitching plate 192b in its uppermost position when frame 96 is lifted for transportation.

It is not necessary to have any crown adjustment for the rear screeds since they are relativley short and can have either end adjusted vertically and also since they are disposed at the extreme side portions of the layer of material being produced. Oscillation of each cutter bar is accomplished as in the main screed through the medium of a gear unit 195 driven by a shaft 196 which is connected thereto by a universal joint 197.

It will be apparent that the rear screeds will act on the material fed rearwardly thereto by the screws 119. They will be initially adjusted to proper elevation by means of the adjusting heads 185 at each end of each screed. During operation of the machine, it may be desired for the operator to adjust either rear screed inwardly or outwardly and this will be facilitated by having a transversely disposed running board 198b suspended from the rear end of the frame section 76. The operator can stand on this running board and operate either of the hand wheels 191 as the machine moves along so as to move the screed further inwardly or outwardly. This is especially desirable when blending one strip with an adjacent strip which has been previously formed especially when the edge of the latter strip is irregular. Also this adjustment can be made quickly to change the width of the strip being produced at any time. As shown best in Figure 27, the forward control pans 95 are always ahead of the inner ends of the screeds 80 and operate on the surface produced by the center screed 31. The rear pans 96 will be behind screeds 80 but will also operate on the surface produced by the center screed even if the rear screeds are adjusted inwardly as far as possible thus, all the pans will engage a surface which has been produced by the forward screed.

The rear screeds 80 are heated in substantially the same manner as the center screed 31. For this purpose each of the rear screeds 80 is provided with an elbow member 198 (Figures 17 and 28) which is pivotally connected thereto at its outer end. The inner end of the screed is provided with a vent 199 to permit escape of the heating medium. The elbow members 198 telescope with a heat pipe 200 which extends transversely of the frame 76 at the rear end thereof. This pipe 200 is connected to a heating unit 201 of a suitable type which is supported at the rear end of the frame 76. This heater 201 receives forced air through a flexible conduit 202 that is connected to a blower 203 provided on the tractor unit and which is driven from the power unit 3 by means of a suitable drive 204 from the shaft 204b. The heater 201 also has the conduit 167 connected thereto so that heating medium will be supplied to the center screed. It is also desirable to heat the leveling pans used for controlling the elevation of the various screeds. For this purpose flexible conduits 205 extend from the pipe 167 to each of the leveling pans 95 while flexible conduits 206 extend from the heater to each of the leveling pans 96. These conduits will merely direct heated air onto the upper surfaces of the pans. Each end of each conduit is tied to the associated pan by suitable connection 208 which will permit ready disconnection.

The heater may be of any suitable type but is preferably of the oil fired forced-air type. A fuel tank will be provided on the frame 76 and this tank is illustrated by the numeral 210 in the diagram in Figure 31. The oil is withdrawn from the tank through a filter 211 by a pump 212 which forces it to the heating unit 201. The pump 212 is driven by a drive 212b from the same drive shaft 204b (Figure 28) that operates the blower 203.

The shaft 22 on the tractor unit 1, previously referred to, is adapted to drive various units on the pivoted frame 76 and is connected thereto by flexible drive connections in order to permit the proper adjustment of the frame 76. Thus, the shaft 22 drives a rearwardly extending shaft 213 supported parallel thereto on the tractor frame. The shaft 22 drives the shaft 213 through the medium of a clutch 214 and a chain and sprocket drive 215. The clutch 214 may be actuated to interrupt the drive to all of the members carried by the frame 76. The rear end of the shaft 213 is connected by a telescoping shaft 216 by means of a universal joint 217. This shaft 216 extends rearwardly and downwardly and is connected to a drive shaft 218 carried by the transverse members 79 of the frame section 76. The connection between the shaft 216 and the shaft 218 is made by means of a universal joint 219. Thus the shaft 218 may move with the frame 76 vertically and relative to the shaft 213. The shaft 218 drives a parallel rearwardly extending shaft 220 which is carried by the frame 76, this drive being by means of chain and sprocket drive 221. The forward end of the drive shaft 220 is connected by a universal joint 222 to a forwardly and downwardly extending shaft 165 of telescoping structure which is connected to the gear unit 164 that oscillates the cutter bar of the center screed 31. Because the shaft 165 is of the telescoping type and is provided with the universal joints 222 and 163, the cutter bar of the screed can be oscillated without interfering with the vertical adjustment or vertical movement of the screed. The shaft 220 extends rearwardly on the frame 76 to drive a gear unit 223. This gear unit drives a pair of telescoping shaft structures 224 which extend outwardly in opposite directions and are connected to the gear units 225 that oscillate the cutter bars of the rear screed. Jaw clutches 225b are associated with units 225 to independently actuate or render inoperative the drive to the cutter bar of either rear screed. A universal connection 226 is provided between the shaft and gear unit 223 and a universal connection 227 is provided between the gear unit 225 and the shaft. Thus, vertical and lateral adjustments of the screeds 80 can be accomplished without interrupting the drives for oscillating the cutter bars thereof. The shaft 220 also drives the chain and sprocket drive 228 which extend laterally and downwardly therefrom. These sprocket drives 228 drive the feeding screws 118 provided in the channels 117.

We provide an arrangement for lifting all parts of the leveling and finishing unit 2 so that such unit is completely suspended from the tractor unit 1 for transportation. This unit includes a pair of lifting rams 230 which are carried on the tractor unit 1 adjacent the arms 26. As shown best in Figures 18 and 23, each ram 230 includes a cylinder which has its lower end anchored at 231 to the tractor frame, a band 232 secured to the frame serving to keep the ram vertical. This ram is provided with a piston 233 and an upwardly extending piston rod 234. Fluid is supplied to the lower end of each ram by means of a line 235. When fluid is so supplied, the piston rod 234 is moved upwardly into engagement with a lifting arm 236 that is anchored by the rods 34 to the arm 26. Thus, when fluid is supplied simultaneously to both rams 230, both of the arms 26 will be lifted and this will serve to lift the runners 23 off the ground. Any substantial oscillation of the suspended runners about their pivots 28 will be prevented by the connection at the forward end thereof which includes the links 28c.

The rear end of the frame 76 of the unit 2 as previously indicated is supported by the rams 81 which suspend it from the tractor unit 1. However, for transporting the machine to a different location it is desirable not only to suspend the runners 23 from the tractor but also to raise the rear screeds 80 as high as possible to completely suspend them from the tractor. This is accomplished by manually controlling the valves 86 to cause them to supply fluid to the rams 81 so that they will lift the rear end of the frame 76 as high as possible. This manual control is illustrated in Figures 1 and 3. It includes a control lever 236 supported for swinging movement on the tractor and which is connected by bell crank levers 237 to a pair of cables 238 mounted on guide arms 239 extending rearwardly from the tractor unit 1 over the arms 88 which are connected to the valves 86. The cables 238 are mounted in the guide arms in such a manner that movement of the lever will exert a pull thereon and will completely lift the arms 238. This will permit the control pans to drop until the valves 86 are in position to supply a maximum amount of fluid to the rams 81 thereby lifting the rear end of the frame 76 to a maximum height on the tractor 1.

The unit 2 will now be completely suspended from the unit 1 for transportation. The runners 23, the center screed 31, the rear screeds 80 and all associated parts will be completely supported from unit 1 at a substantial height. Thus moving of the machine to a different location merely by driving the tractor unit 1 is possible.

When it is desired to lower the unit 2 again into operative position, fluid is exhausted from the lower ends of the rams 230 and the upper ends of the rams 81. The weight of the suspended parts will then cause the unit 2 to be lowered. The rams 230 are controlled by manually actuated valves which will be referred to later. To exhaust fluid from the rams 81, the control lever 236 is actuated so as to lower the arms 238 thereby controlling the valves 86 to exhaust fluid from the rams.

The hydraulic system is illustrated diagrammatically in Figure 30. It comprises a pressure pump 240 which is carried on the tractor 1 and which is driven by a suitable drive 241 (Figure 28) from the power unit 3. A pressure line 242 leads from the pump and an inlet line 243 leads to the pump, the inlet line being connected to a filter 244 disposed in a supply tank 245. A relief valve 246 is disposed in the line 242 and is connected by a return line 247 to a return manifold 248. The pressure line 242 is connected to a pressure line 235 which leads to the line 235a that is connected to the rams 230. A manual valve 249 in line 248 controls the supplying of pressure fluid to the rams 230. A manual valve 250 controls the return of fluid from the line 235 into a return line 251 which is connected to the manifold 248. A pressure gauge 252 is also connected to line 242. A pressure line 253 leads from the line 242 and is controlled by a manual valve 254. The line 253 is connected to a line 254b which leads to the control valves 56. These valves may be cut out of the circuit by the valve 254. A return line 255 leads from the valves 56 and is connected by a line 256 to the tank 245. The return manifold 248 is connected to line 256 by line 257. Another pressure line 258 is connected to the line 242 and leads to the control valves 86. Return lines 259 lead from the valves 86 and are connected by a line 260 to the return manifold 248. A check valve 261 is provided in pressure line 258. A special type of check valve 262 is connected in the line 260 as a safety means to prevent dropping of the rear end of the frame 76 in case of failure of the pump 240. This check valve is connected by a line 263 to the line 258.

The check valve 262 is illustrated in detail in Figure 32. It comprises a housing to the lower end of which the line 263, leading from the pump is connected. The line 260 is connected to the housing at opposite sides thereof. A passageway 264 in the housing connects the portion of the line 260 leading from valves 86 to the upper part of the housing which is connected to the passageway 265 that is connected to the other portion of line 260, by an opening 266 which provides a valve seat for a disc valve 267. An adjustable compression spring 268 in the top of the housing rests on the disc valve 267. Normally, the pressure exerted by the spring 268 is overcome by pressure from the pump line 263 acting on a piston 269 formed on the lower end of a vertical stem 270 connected to the disc 267. However, if pump pressure falls below any predetermined pressure, the spring 268 will force the disc 267 on its seat. This will interrupt flow of pressure in a reverse direction through the line 260 which would permit the rams 81 to drop the rear end of the frame and possibly cause injury to parts supported thereby or force the rear screeds onto the newly laid material.

The valves 56 and 86 are identical. One of these valves is illustrated in detail in Figures 10 and 11. Each valve comprises a housing in which a valve stem 271 is mounted for vertical sliding move. The housing is provided with a pressure inlet 272 and an outlet 273 connected in the main hydraulic system. An additional outlet 274 is provided which is connected to the ram to be actuated. The stem 271 is reduced at two points to provide the annular passageway 275 and 276. It will be noted that the stem 271 is disposed for sliding movement in a sleeve 277 disposed in the housing. This sleeve has a passageway 278 with an inturned portion 279 at its upper end. When the valve stem 271 is in its lowermost position, pressure fluid enters through inlet 272 into the annular chamber 276 around the stem and further flow is stopped because the enlarged portion 280 on the valve stem is below opening 279. At this time any fluid in the connected ram, will exhaust from the line connected to the opening 274, through the passageway 275 around the valve stem, out through opening 279 and passage 278 and finally out through the outlet 273. As soon as the valve stem is lifted sufficiently, the opening 279 is closed by valve stem portion 280 and the annular passageway 276 is moved into position to connect inlet 272 with outlet 274 so that pressure fluid will be supplied to the ram.

In order to provide some guide for the operator of the machine, who will be stationed on the tractor 1, so that he can keep the machine on the proper course, for example, next to a strip already laid, we provide the line indicator structure illustrated in Figures 1 and 3. This structure may be mounted at either side of the machine depending upon which side the previously laid strip is located. The line indicator structure comprises a forwardly extending rod 285 which has its rear end slidably mounted in a clamping sleeve 286 carried by a segmental bracket 287. The bracket 287 is carried on the tractor frame by a clamping pivot 288. The outer end of the rod 285 has pivotally suspended thereon a pin 289 which will extend downwardly to a point closely adjacent the surface to be covered. The rod 285 may be properly adjusted axially and the bracket 287 swung about its pivot to locate the pin 289 at the edge of the previously laid strip. The operator can thereafter view the location of the pin relative to the edge of the strip in guiding the machine properly along its course.

An indicating arrangement is provided at the top of the tractor 1 to indicate the level of the screed-supporting frame 33 and, therefore, the level of the center screed 31. This indicating arrangement shows the level of both sides of the frame. It comprises, as shown in Figures 1 and 4, an upstanding indicator 290 which is suitably calibrated and is carried by the tractor. An indicating pointer 291 extends upwardly into association therewith and its lower end is secured to the beam structure 32 of the vertically movable frame 33. Therefore, when the frame 33 moves vertically at either side, the pointer 291 at that side will cooperate with member 290 to indicate the level of the end of the screed.

In Figure 4, we have illustrated another indicating device associated with the screed frame. This device comprises a rigid arm 292 extending upwardly from the beam structure 32 at the center thereof. The upper end of this arm carries a bracket 293 to which is pivoted a pointer 294 that also carries a bubble indicator 295. A screw 296 is carried on the bracket 293 for engaging the lower end of the pointer to move it about its pivot, the bracket being calibrated at the pointer to indicate the adjustment of the pointer away from vertical position. In the use of this leveling device, if the screed is adjusted into tilted position, the tilt will be indicated by the bubble indicator 295. The screw 296 is then adjusted to bring the bubble indicator to level indicating position. Therefore, during subsequent operation of the machine, any deviation of the screed from the original tilted position will be indicated by the bubble indicator.

In Figures 33 to 35, we have illustrated a somewhat modified form of our machine but which, however, employs the same basic principles.

In the modified machine, the unit 1a is practically identical with the unit 1 of the preferred form of our machine. The trailing unit 2a is quite similar to the unit 2 of the preferred form of our machine but is different in some respects. The unit 2a in this case includes the frame section 76a which is pivoted at its forward end by the pivots 78a to the transverse supporting beam 32a, this structure being as before. However, the beam 32a is carried by arms 26a which are vertically disposed and which are mounted in guide channels 29a carried by the tractor unit 1a so that the arms 26a can move vertically. It will be noted that the arms 26a are straight and the runners 23a are pivoted to the lower ends thereof at 28a. Because the arms 26a are straight in this instance, the runners 23a are slightly shorter. The rest of the unit 1a is the same as before except that the positive means is not provided for feeding the material rearwardly to the rear screeds and the control pan arrangement is different.

The control pan arrangement in this modified machine consists of two pans only which are indicated by the numeral 96a and correspond to the two rear pans 96 of the other machine. These pans are suspended from the rear end of the frame 76a. To suspend each pan an L-shaped arm 88a has its upper end rigidly supported by one of the transverse members of the frame. A vertically adjustable pivot structure 100a is provided for supporting the forward edge of the pan from the arm. Adjacent the rear portion of the pan a rod 92a has its lower end pivotally connected thereto and its upper end threaded into a coupling 93a. A gear 94a is keyed on the rod 92a and can be rotated by means of a gear 94b carried on the lower end of a shaft 94c that is rotatably mounted on the frame 76a and can be rotated by a suitable handwheel. The coupling 93a is connected to the lower end of the stem of the valve 86a. It will be apparent that with this adjustment the pan 96a can be raised or lowered by rotating shaft 94c and this will change the position of the valve stem in the valve 86a. This adjustment will be used in initially setting the valve properly and in setting the pan 96a at the proper level. The valve 86a controls the associated ram 81a which is used in suspending the frame 76a from the tractor. The pans 96a will actuate the valve 86a to keep the rear screeds 80a at the same level as the center screed 31a. In order to supply maximum fluid to the rams 81a to lift the frame 76a as high as possible on the unit 1a, the valves 86a can be mechanically actuated. For this purpose an eccentric lever 236a is pivoted to the rear of the frame 76a and is connected by cables 238a to the rear edge of the pan 96a. By actuating these levers the rear end of the pan 96a is lifted and this moves the valve stem of the valve 86a to proper position to supply the maximum amount of fluid to the associated ram 81a. Both levers 236a will be actuated in order to lift both sides of the frame 76a. It will be noted that the side plates 192a associated with the rear screeds 80 are carried by pin and slot connections 192d to permit free vertical movement thereof.

It will be apparent that this machine is similar in operation to the preferred form except that two control pans only are used for controlling the level of the rear screeds 80a. It will be noted that these screeds, as in the first machine, slide on the surface previously produced by the center screed 31a.

Assuming that the machine is being transported to the job or to a particular location on the job, the rams 230 and the rams 81 will have been actuated to lift the unit 2 completely and support it from the runners. The crawlers 4 will be driven by proper manipulation of the clutches 19 to move the tractor and steer it to the proper position. Then the rams 230 and 81 will be actuated to lower the unit 2 into operative position.

The screed-driving clutch 214 (Figure 28) should always be engaged when laying material and at all other times it should be disengaged. The cutting bars of the rear screeds 80 can be independently operated by engaging or disengaging the jaw clutches 225b associated with each of the gear units 225.

The conveyors 6 of the unit 1 may be started and actuated independently by means of the clutches 15 and the spreading member 8 may be started and independently controlled by means of the clutch 17 in order to obtain proper distribution of material before the material is subjected to the screeds.

The heater 201 is started, the fuel pump 212 associated therewith being actuated by the drive provided therefor. The hydraulic pump 240 is also actuated by its drive.

In starting to lay a strip with the machine, the forward end of the screed-supporting frame and, therefore, the center screed 31 is adjusted to the proper level and tilt by means of the handwheels 38. This will determine the desired thickness of the mat or strip which can be read on the indicators 290. The screed cutting bar may be tilted about its longitudinal axis properly by adjustment of the shafts or pins 149. The level-indicating device 294 is adjusted so that the bubble indicator 295 indicates level position. Any deviation from the selected pitch of the screed will be indicated by the bubble indicator.

As the machine moves along a truck will be pushed along by the machine and will discharge its contents into the hopper 5. By properly controlling the conveyor 6 and the spreading member 8, the proper amount of material will be deposited on the surface to be covered ahead of the center screed 31 and will be properly distributed across the surface in front of the screed. The material will be acted upon by the center screed, the advancing oscillating cutter bar 127 serving to break up the material, gradually force it under its angular serrated edge and eventually compact and smooth off the material. If the block-off plates 120 are in their rearwardmost position, material can bleed back past the ends of the screed 31 into the channels 117. This material will be positively fed by means of the screws 118 to the inner ends of the rear screeds 80. Then the rear screeds will act on this material and will spread it laterally and rearwardly to the outer side plates 192. The side plates 192b will form the straight edges on the layer or mat produced and the lateral position of these side plates will be determined by adjustment of the handwheels 191. These side plates will slide on the surface regardless of the vertical positions, within limits, of the rear screeds 80. The vertical positions of the rear screeds 80 will have been adjusted previously by operating the knobs 181, the screeds being adjusted to the proper level and being tilted, if necessary, by adjusting one end higher than the other, the tilt being a continuation of the tilt of the center screed 31.

As previously indicated, due to the fact that the center screed 31 is substantially midway between the forward and rearward ends of the equalizing runners 23, any vertical movement of such runners, which will be slight due to their length, will be minimized at the center screed. Furthermore, since the runners are of considerable length and are pivoted at their centers of gravity, inequalities in the surface over which they slide will have little effect in producing vertical movement of the runners. Since the control pans 95 and 96 will slide on the surface produced by the center screed 31, and since they control the elevation of the rear screeds 80, the rear screeds 80 will be automatically maintained by means of the valves 86 and rams 81 at such elevations that the portions of the strips which they surface will be indistinguishable lateral continuations of the center part of the strip produced by the screed 31. None of the screeds carry any substantial weight of the machine on the surface being produced since the screed-supporting frame 33 is carried at its forward end by the runners 23 and at its rear end by the frame of tractor 1. Thus, undue compaction of the material being surfaced will be precluded.

It will be noted that since the valve 86 is intermediate each of the arms 88 and since the pans 95 and 96 are at the ends of these arms, any slight inequality in the surface produced by the screed 31 will be divided and further averaged out in the surface produced by the rear screed 80 controlled by such pans 95 and 96. Furthermore, it will be noted from Figure 27 that the pans 95 are so located that they always slide on the surface produced by the screed 31 even though screeds 80 are adjusted inwardly as far as possible.

If it is desired to lay a strip merely of the width of the center screed 31, neither of the rear screeds need be used and the edge of the strip will be formed by the plates 120b which will slide on the surface regardless of the vertical position, within limits, of the screed. At this time the block-off plates 120 will be moved to their forwardmost positions to prevent material from bleeding back past the ends of the screed 31. Furthermore, at this time the clutches 225b for the cutter bars of the rear screeds can be adjusted to render the oscillating drive thereof inoperative. If desired, only one of the rear screeds may be used and at that time the block-off plate 120 at that side will be in its forwardmost position, the block-off plate at the other side being in its rear positon. At any time either of the block-off plates may be adjusted to different positions to control the amount of material feeding back past the end of the screed at that side.

The width of the strip being produced can be quickly changed at any time by adjusting the handwheels 191 which control the lateral positions of the rear screeds 80.

Whenever it is desired to match one edge of the strip being formed with the adjacent edge of a previously formed strip, the pin 49 at that side of the machine is removed to permit the automatic control to function so that it can control the elevation of that end of the main screed 31, the control embodying the valve 58 and pan 68 which will control the ram 59 at that side of the machine. The pan will slide along the strip previously produced and will so control the elevation of the adjacent end of the screed 31 that the surface produced thereby will exactly match the surface of the previously formed strip. The end of the center screed will be spaced laterally from the edge of the previously formed strip but the following rear screed will fill in this space and produce a proper surface matching the previously laid surface since the pans 95 and 96 will slide over the surface leveled by the end of the screed 31 which is controlled by the pan 68. In some cases, it may be desirable to use the automatic control for both ends of the screed 31, for example, when laying a middle strip between two previously formed side strips.

It will be apparent from the above description that we have provided a novel type of paving machine having many advantages. Most of the important advantages of this machine have been discussed throughout the preceding description and others will be apparent from the drawings and the following claims.

Having thus described our invention, what we claim is:

1. A machine of the type described comprising a unit supported for travel over the relatively rough surface to be covered, a material leveling unit disposed in cooperative relationship with the first unit and including elongated runner members adapted to slide along the surface to be covered and bridge irregularities thereof, means for connecting said runner members to the first unit for relatively free vertical movement, said material leveling unit also including a frame having its forward end pivotally supported by means including said runner members, a transversely disposed forward leveling member carried by said frame and adapted to act on material disposed in front thereof on the surface to be covered and a rear leveling member disposed on said frame behind the forward leveling member and extending laterally beyond the adjacent end thereof, means for suspending the rear end of said frame from said first unit and being operable to vary the level of the rear end of the frame, and control means for automatically operating said suspending means to control the level of the rear end of the frame, said control means including a gauge member which acts on the surface leveled by said forward leveling member.

2. A machine according to claim 1 including hydraulic ram units for suspending the rear end of said frame from said first unit and wherein said gauge member actuates a valve which controls said ram units.

3. A machine according to claim 1 wherein the frame is connected at each side to said runner members by a vertically adjustable connection and including means for automatically adjusting said connection, said means comprising a gauge member which acts on a predetermined grade line adjacent the corresponding side of the machine to automatically control the level of one side of the forward end of the frame.

4. A machine according to claim 3 wherein mechanical means is also provided for adjusting said connection.

5. A machine according to claim 1 wherein the forward end of the frame is connected to the runner members for manual vertical adjustment relative thereto and wherein means is provided for connecting the rear leveling member to the frame for both vertical and lateral adjustment.

6. A machine according to claim 1 wherein a pair of the rear leveling members are supported by the frame, said members being disposed on the frame with their forward ends converging towards each other, said members being connected to the frame for both vertical and lateral adjustment.

7. A machine according to claim 6 wherein a side edging plate is supported at the outer end of each of said rear leveling members for free vertical movement relative thereto so that the edging plate will contact the surface.

8. A machine according to claim 7 wherein the forward leveling member has spaces at its ends to permit material to bleed back past the ends to the rear leveling members, block-off means supported by said frame at the ends of said leveling member and movable to control the flow of material back past the ends of said member, and side edging plates carried by said frame for free vertical movement relative to the forward leveling member so that the edging plates will contact the surface.

9. A machine of the type described comprising a self-propelled tractor unit supported on crawlers for travel over the relatively rough surface to be covered, said tractor unit comprising means for receiving the material and depositing it on the surface to be covered, a material leveling and finishing unit disposed in cooperative relationship with the tractor unit and including elongated runner members adapted to slide along the surface to be covered and bridge irregularities thereof, vertically yieldable connections between said runner members and said tractor unit for connecting said runner members to the tractor unit for relatively free vertical movement, said material leveling and finishing unit also including a frame and pivot supports for the forward end of the frame, a transversely disposed forward screed member carried at the forward end of said frame and adapted to act on material disposed in front thereof on the surface to be covered, a pair of rear screeds disposed on said frame behind the forward screed and having their forward ends converging towards each other, independent vertically adjustable connections between each end of said forward screed and said frame, a support for each of said rear screeds mounted on said frame for lateral movement, independent vertically adjustable connections between each end of each of said rear screeds and said support, suspending means supported from said first unit and connected to the rear end of said frame for suspending the rear end of said frame from said first unit and being operable to adjust the frame about its pivots to vary the vertical position of the frame, and control means for automatically operating said suspending means, said control means including a gauge member which acts on the surface produced by said forward screed.

10. A machine according to claim 9 wherein said vertically yieldable connections between the runners and the tractor unit include vertical guide arms having their lower ends pivoted to said runners, and guides carried by said tractor unit for receiving the upper portions of said arms and permitting relatively free vertical movement therein.

11. A machine according to claim 10 wherein said tractor unit includes a transversely disposed spreading member and wherein said guides are disposed behind said member on said tractor unit, said arms having forwardly extending portions to which said runners are pivoted, said runners being pivoted to the arms substantially midway between the ends of said runners.

12. A machine according to claim 10 wherein the forward portion of the frame of the material leveling and finishing unit is suspended from said guide arms by independent vertically manually adjustable connections between said frame and the adjacent guide arms which permit vertical adjustment of each side of said frame relative to its associated arm.

13. A machine according to claim 12 wherein each of the manually vertically adjustable connections for suspending the frame from each guide arm includes an additional guide structure which can be rendered operative to permit relative vertical movement of the side of the frame adjacent the arm, and means for automatically controlling said relative vertical movement, said means comprising a control gauge disposed at the adjacent side of the machine and adapted to cooperate with a predetermined grade line at that side of the machine.

14. A machine according to claim 13 wherein said automatic controlling means comprises a hydraulic ram unit supported by the arm and a control valve for said ram actuated by said control gauge.

15. A machine according to claim 14 wherein the means for suspending the rear end of the frame comprises hydraulic rams disposed at opposite sides thereof and connected to the frame and tractor unit, and wherein said control means comprises pans at opposite sides of the frame and suspended therefrom and which operate on the surface produced by the forward screed, each of said pans being connected to a control valve which is also connected to the ram at the corresponding side of the machine.

16. A machine according to claim 12 wherein the means for suspending the rear end of the frame comprises hydraulic rams disposed at opposite sides thereof and connected to the frame and tractor unit, and wherein said control means comprises at least one pan at each side of the frame suspended therefrom and which operate on the surface produced by the forward screed, each of said pans being connected to a control valve which is also connected to the ram at the corresponding side of the machine, said pan being supported for vertical movement relative to the frame and the associated valve being actuated by such vertical movement.

17. A machine according to claim 16 wherein a pair of pans are provided in tandem relationship at each side of the machine and are suspended from an arm carried by the rear end of the frame for relatively vertical movement, said arm being connected intermediate its ends to an actuating valve which is also connected to the ram at the corresponding side of the frame.

18. A machine according to claim 10 wherein hoisting means is carried by the tractor unit and is connected to the guide arms for lifting the guide arms and associated parts to completely support the guide arms and connected runner members from the tractor unit.

19. A machine according to claim 18 wherein said hoisting means comprises hydraulic rams carried by the tractor unit and connected to said arms to lift said arms.

20. A machine according to claim 10 wherein the ends of the forward screed member are spaced from said runner members to permit material to bleed back past the ends thereof, and apron members carried by said frame in parallel relationship to said runners and extending between the ends of the screed and said rear screeds for directing the material which bleeds back past the ends of the forward screed to the rear screeds.

21. A machine according to claim 20 wherein block-off plates are mounted on said frame in cooperative relationship with said aprons and are movable forwardly beyond the ends of the screed to block-off the flow of material past such ends.

22. A machine according to claim 21 wherein feed screws are mounted on said frame and are disposed in the spaces between said runners and said aprons for positively feeding the material rearwardly to said rear screed.

23. A machine according to claim 22 including vertical guides carried by the frame for supporting said aprons for free vertical movement so that the lower edges of said aprons will always be in contact with the surface over which the machine passes and wherein the outer ends of the rear screeds are provided with side edging plates which are mounted thereon for vertical movement so that they will always be in contact with such surface.

24. A machine according to claim 9 wherein each of the screed members includes an oscillatable cutter bar.

25. A machine according to claim 24 wherein a flexible drive is provided between the tractor unit and the leveling and surfacing unit for oscillating said cutter bars.

26. A machine according to claim 25 wherein a hinge structure is provided for mounting each cutter bar on the screed so that it can be tilted about its axis.

27. A machine according to claim 26 including thrust bearings at the rear edge of each cutter bar.

28. A machine according to claim 27 wherein each of the cutter bars has a serrated forward edge disposed at an angle to a rear flat surfacing plate.

29. A machine according to claim 25 wherein a clutch is provided for interrupting the drive to said cutter bars and wherein a separate clutch is associated with the cutter bar of each of said rear screeds for controlling oscillation of such cutter bar.

30. A machine according to claim 9 wherein the rear end of the frame is suspended by means of hydraulic rams, said control means including a valve connected in a hydraulic circuit with said rams and controlled by said gauge, and a safety valve incorporated in said system and connected to said rams for preventing dropping of the ram-suspended frame in case of decrease of hydraulic pressure.

31. A machine according to claim 30 including rams for suspending the forward end of the frame from the tractor unit.

32. A machine according to claim 31 including additional rams associated with the frame at both sides thereof at the forward end, and means for controlling said rams, said means comprising control gauges adapted to cooperate with a predetermined grade line at each side of the machine.

33. In a machine of the type described, a screed structure, said screed structure comprising a supporting beam, a cutter bar supported on said beam for longitudinal oscillation, said cutter bar including a support carried by said beam and a channel member having its forward edge hinged to said support, and means connected to said beam and to said channel member for vertically adjusting its rear edge to move the channel about the hinge connection and thereby tilt the lower surface of said channel as desired, said means comprising vertically adjustable rods for suspending the rear edge of said channel member from said beam, the lower ends of said rods carrying thrust rollers which engage pins carried at the rear side of said channel and extending longitudinally thereof.

34. A structure according to claim 33 wherein the cutter bar is suspended from the beam for oscillation by pendulum links.

35. A structure according to claim 34 wherein the channel member of the cutter bar is provided with an angular forward edge which is serrated and is disposed ahead of a flat finishing surface formed on the bottom of the channel.

36. A structure according to claim 35 including means for heating the channel member of the cutter bar.

37. A machine according to claim 24 including means for heating each of the cutter bars.

38. A machine of the type described comprising a unit supported for travel over the relatively rough surface to be covered, a material leveling unit disposed in cooperative relationship with the first unit and including elongated runner members adapted to slide along the surface to be covered and bridge irregularities thereof, means for connecting said runner members to the first unit for relatively free vertical movement, said material leveling unit also including a frame having its forward end pivotally supported by means including said runner members, a transversely disposed forward leveling member carried by said frame and adapted to act on material disposed in front thereof on the surface to be covered, a pair of rear leveling members supported by said frame with their forward ends converging towards each other and with their rear ends extending laterally beyond the ends of said forward leveling member, said pair of members being connected to the frame for both vertical and lateral adjustment, a side edging plate supported at the outer end of each of said rear leveling members for vertical movement relative thereto so that the edging plate will contact the surface, screw members extending from the ends of said forward leveling member to the inner ends of said rear leveling members so as to positively feed the material which feeds back past the ends of the forward leveling member to the rear leveling members, and block-off means supported by said frame at the ends of said leveling member and movable to control the flow of material back past the ends of said member.

39. A machine according to claim 38 wherein the means for suspending the rear end of the frame comprises hydraulic ram units and wherein a gauge member is provided at each side of the frame for actuating a connected valve member which controls one of the ram units, said gauge member being in the form of a pan which slides along the surface leveled by said forward leveling member.

40. A machine according to claim 39 wherein the forward end of the frame is supported by the runner members through the medium of a vertically adjustable connection, manual means for adjusting said connection, and additional automatic means for adjusting said connection, said automatic means including a ram for supporting one side of the forward end of the frame, and means for controlling said ram, said means including a valve and a gauge member for controlling said valve, said gauge member comprising a pan adapted to operate on a predetermined graded surface at the adjacent side of the machine.

41. In a machine of the type described, a material leveling unit, said unit including a forward leveling member adapted to act on material disposed in front thereof on the surface to be covered, and a rear leveling member disposed behind the forward leveling member and extending laterally beyond the corresponding end thereof, supporting means for supporting said rear leveling member for vertical movement relative to the forward leveling member, a control system for automatically controlling said supporting means to control the level of the rear leveling member and a gauge member connected in said control system and located to contact with the surface of the material levelled by said forward leveling member for actuation of said control system to control said supporting means, means for supporting one end of the forward leveling member for vertical movement, a control system for automatically controlling said supporting means to control the level of said end of said forward leveling member, and a gauge member connected in said control system and adapted to contact with a selected grade line at the adjacent side of the machine to control said supporting means.

42. Apparatus according to claim 41 wherein said supporting means for said end of the forward leveling member is a hydraulic unit connected in a hydraulic system, said last-named gauge member being connected in said system to control said unit which controls the level of the end of the forward leveling member.

43. In a machine of the type described, a material leveling unit, said unit including a forward leveling member adapted to act on material disposed in front thereof on the surface to be covered, a pair of rear leveling members disposed behind said forward leveling member and having their forward ends converging towards each other and their rear ends extending laterally and rearwardly beyond the corresponding ends of the forward leveling member, spaces being provided at the ends of the forward leveling member to permit material to bleed back to the rear leveling members, screw members carried by the leveling unit and extending from the ends of the farward leveling member to the rear leveling members for positively feeding the material to the rear leveling members, block-off means mounted at the ends of said forward leveling member and operable to vary or interrupt the flow of material past the ends of the leveling member to said rear leveling members, supporting means for supporting said rear leveling members for vertical movement relative to the forward leveling member, said supporting means including units for supporting both of said rear leveling members but independently of each other, a control system for controlling said units automatically and including a gauge member connected in said control system for controlling each of said units, said gauge members being so located that they will contact with the surface of the material leveled by said forward leveling member.

44. In a machine of the type described, a material leveling unit including a forward leveling member adapted to act on material disposed in front thereof on the surface to be covered and a rear leveling member disposed behind the forward leveling member, supporting means for supporting said rear leveling member for vertical movement relative to the forward leveling member, a control system for automatically controlling said supporting means to control the level of the rear leveling member, a gauge member connected in said control system and acting on the material leveled by said forward leveling member for actuating said control system to control said supporting means, supporting means for supporting one end of the forward leveling member for vertical movement, and a gauge member connected in said control system and located to contact with a selected grade line at the adjacent side of the machine for actuating said control system to control said last-named supporting means.

ROBERT C. BOHANNAN.
HENRY M. PICKARD.
HAROLD R. HORNING.

REFERENCES CITED

The following references are of record in the file of this patent:

UNITED STATES PATENTS

| Number | Name | Date |
|---|---|---|
| 2,054,437 | Mosel | Sept. 15, 1936 |
| 2,138,828 | Barber | Dec. 6, 1938 |
| 2,162,665 | Mosel | June 13, 1939 |
| 2,185,645 | Mosel | Jan. 2, 1940 |
| 2,214,093 | Venable | Sept. 10, 1940 |
| 2,295,519 | Millikin et al. | Sept. 8, 1942 |
| 2,453,510 | Jackson | Nov. 9, 1948 |
| 2,473,961 | Mandt et al. | June 21, 1949 |